United States Patent

Yanagi et al.

[11] Patent Number: 5,867,259
[45] Date of Patent: Feb. 2, 1999

[54] HIDDEN-MARK OBSERVING APPARATUS AND HIDDEN-MARK OBSERVABLE LENS-METER

[75] Inventors: Eiichi Yanagi; Shinichi Kobayashi; Yukio Ikezawa, all of Tokyo, Japan

[73] Assignee: Kabushiki Kaisha Topcon, Tokyo, Japan

[21] Appl. No.: 922,443

[22] Filed: Sep. 3, 1997

[30] Foreign Application Priority Data

Sep. 5, 1996 [JP] Japan .................................. 8-235277
Feb. 26, 1997 [JP] Japan .................................. 9-042206

[51] Int. Cl.[6] .................................................. G01B 9/00
[52] U.S. Cl. .................................................. 356/124; 356/127
[58] Field of Search .................................... 356/124, 125, 356/126, 127, 364–369

[56] References Cited

U.S. PATENT DOCUMENTS

| | | | |
|---|---|---|---|
| 4,564,291 | 1/1986 | Yoshino et al. | 356/125 |
| 4,641,964 | 2/1987 | Mitani et al. | 356/125 |
| 5,100,232 | 3/1992 | Smith et al. | 356/124 |
| 5,396,324 | 3/1995 | Kurachi et al. | 356/124 |
| 5,719,668 | 2/1998 | Oana et al. | 356/124 |

*Primary Examiner*—Hoa Q. Pham
*Attorney, Agent, or Firm*—Finnegan, Henderson, Farabow, Garrett & Dunner, L.L.P.

[57] ABSTRACT

A progressive power lens (L) is illuminated with a collimated light beam through an illuminating optical system (2) comprising an LED (5), a pinhole plate (6), and a collimator lens (7). The shadow of the hidden mark of the progressive power lens (L) is projected onto a screen (4) by the light beam transmitted through the progressive power lens (L).

14 Claims, 23 Drawing Sheets

FIG. 6
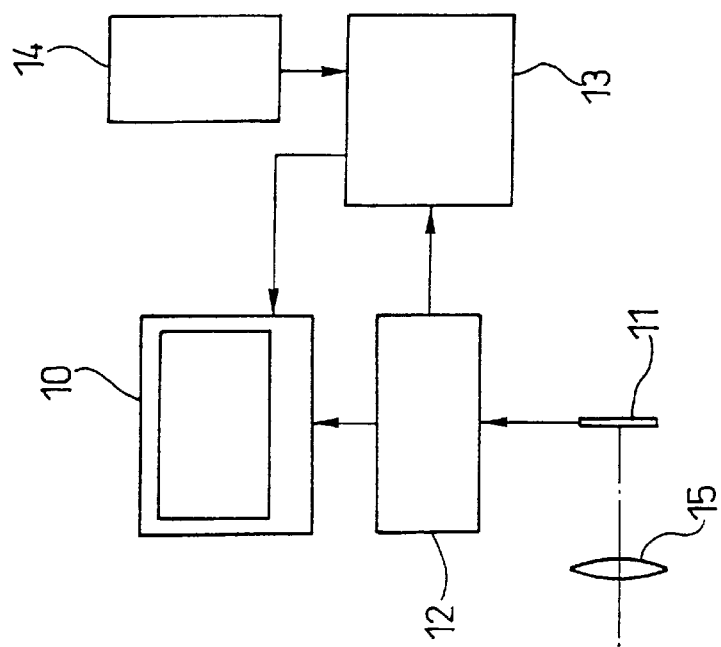
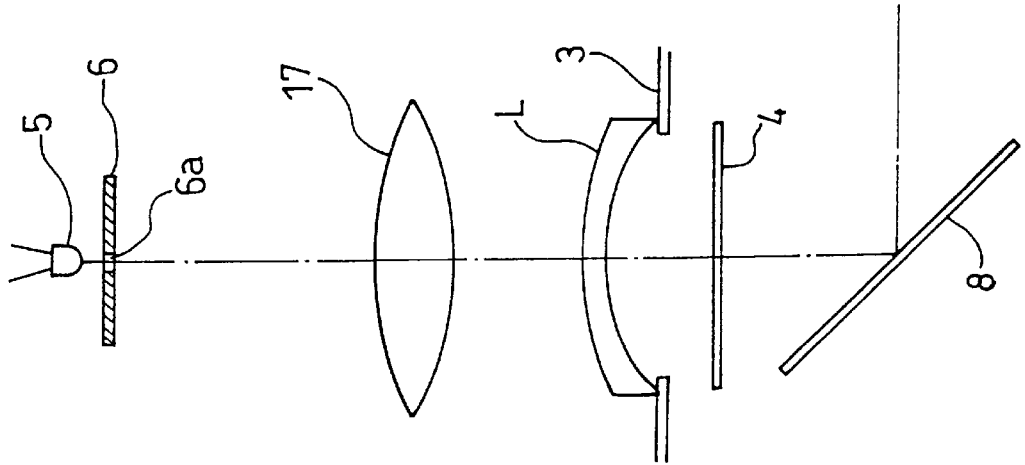

MEASURING OPTICAL PATH

HIDDEN-MARK OBSERVING APPARATUS AND HIDDEN-MARK OBSERVABLE LENS-METER

BACKGROUND OF THE INVENTION

1. Field of the Invention

This invention relates to a hidden-mark observing apparatus that observes the hidden marks of a lens to be examined (hereinafter referred to as a subject lens), particularly, of a progressive power lens (i.e., varifocal lens) and relates to a lens-meter that is capable of observing these hidden marks.

2. Description of the Related Art

In general, there are painted marks and stamped marks on the surface of an unprocessed progressive power lens. From a painted mark, the lens maker, lens type, and the distance portion and near portion positions of the lens can be identified. Therefore, when the power of an unprocessed progressive power lens is measured by, for example, a lens-meter, the measurement can be performed at the marked position. However, if once an unprocessed lens is processed and the framing is completed, the painted mark will be wiped off by alcohol and the like and therefore it will be very troublesome to investigate the addition power of the framed progressive power lens even by the use of a latest lens-meter with a progressive measuring function.

On the other hand, the hidden mark stamped on the progressive power lens surface includes the lens' geometrical center position, added lens power, and so on, in addition to the lens maker and the lens type. Therefore, if the stamped mark is deciphered, the added lens power, etc., can be identified.

However, the hidden mark is a very shallow stamp so that it does not become a hindrance when actually used. For this reason, in order to perform the specification or decipherment of the hidden mark position, the hidden mark is held before a fluorescent light, or the reflection at a shallow angle is viewed. However, there is a problem in that the discovery and decipherment of hidden marks are very difficult for an unskilled person.

SUMMARY OF THE INVENTION

An object of the present invention is to provide a hidden-mark observing apparatus which can easily perform the decipherment of the hidden marks of a progressive power lens and a lens-meter which is capable of observing these hidden marks.

The aforementioned object of the present invention is achieved by a hidden-mark observing apparatus, wherein a subject lens is illuminated with illuminating light and observation of a hidden mark of the subject lens can be made possible by a shadow of the subject lens which is formed by the illuminating light.

The aforementioned object is also achieved by a lens-meter comprising: an illumination means for illuminating a subject lens by a collimated light beam; an area sensor for receiving the collimated light beam transmitted through the subject lens; a patterning plate interposed between the subject lens and the area sensor, optical characteristics of the subject lens being measured based on images of patterns in the patterning plate which are formed on the area sensor by the patterning plate; and a hidden-mark observing system for observing a hidden mark of the subject lens by observing a shadow of the subject lens which is formed by the collimated light beam projected on the subject lens.

In addition, the aforementioned object is achieved by a lens-meter comprising: an optical measuring path provided with a patterning plate for measuring optical characteristics of a subject lens; and an optical observing path for observing a hidden mark of the subject lens; the optical observing path being provided separately from the optical measuring path; and wherein an image of a pattern in the patterning plate and an image of the hidden mark are projected onto a single area sensor so that the observation of the hidden mark and the measurement of the optical characteristics of the subject lens can be performed.

Furthermore, the aforementioned object is achieved by a lens-meter comprising: a means for illuminating a subject lens by a collimated light beam; an area sensor for receiving the collimated light beam transmitted through the subject lens; a patterning plate interposed between the subject lens and the area sensor, optical characteristics of the subject lens being measured based on images of patterns in the patterning plate which are formed on the area sensor by the patterning plate; and wherein: an optical path for the collimated light beam is divided into a first optical path for measuring the optical characteristics and a second optical path for observing a hidden mark of the subject lens; the patterning plate is provided in the first optical path; and a shadow of the subject lens, which is formed by the collimated light beam in the second optical path when the subject lens is placed within the second optical path, is projected onto the area sensor for receiving an image of a pattern, thereby performing the observation of the hidden mark.

Moreover, the aforementioned object is achieved by a lens-meter comprising: a means for illuminating a subject lens by a collimated light beam; an area sensor for receiving the collimated light beam transmitted through the subject lens; a patterning plate interposed between the subject lens and the area sensor, optical characteristics of the subject lens being measured based on images of patterns in the patterning plate which are formed on the area sensor by the patterning plate; and wherein: an optical path for the collimated light beam is divided into a first optical path for measuring the optical characteristics and a second optical path for observing a hidden mark of the subject lens; the patterning plate and the area sensor are provided in the first optical path; an optical element is provided for guiding a shadow of the subject lens to the area sensor, the shadow of the subject lens being formed by the collimated light beam in the second optical path when the subject lens is placed within the second optical path; and the observation of the hidden mark of the subject lens is performed by the shadow of the subject lens which is formed on the area sensor.

Additionally, the aforementioned object is achieved by a lens-meter comprising: a means for illuminating a subject lens by a collimated light beam; an area sensor for receiving the collimated light beam transmitted through the subject lens; a patterning plate interposed between the subject lens and the area sensor, optical characteristics of the subject lens being measured based on images of patterns in the patterning plate which are formed on the area sensor by the patterning plate; and wherein: an optical path for the collimated light beam is divided into a first optical path for measuring the optical characteristics and a second optical path for observing a hidden mark of the subject lens; the patterning plate and the area sensor are provided within the first optical path and also a screen is interposed between the patterning plate and the area sensor; an image forming lens is provided for forming an image of a pattern onto the area sensor, the image of the pattern being formed on the screen; an optical element is provided for guiding a shadow of the subject lens to the screen, the shadow of the subject lens being formed by the collimated light beam in the second optical path when the subject lens is placed within the second optical path; and the observation of the hidden mark of the subject lens is performed by forming the shadow of the subject lens on the screen.

BRIEF DESCRIPTION OF THE DRAWINGS

FIG. 6 is an explanatory diagram showing another example of the second embodiment;

DETAILED DESCRIPTION OF THE EMBODIMENTS

Embodiments of a hidden-mark observing apparatus and a hidden-mark observable lens-meter according to this invention will hereinafter be described based on the drawings.

(First Embodiment)

Figure 1:
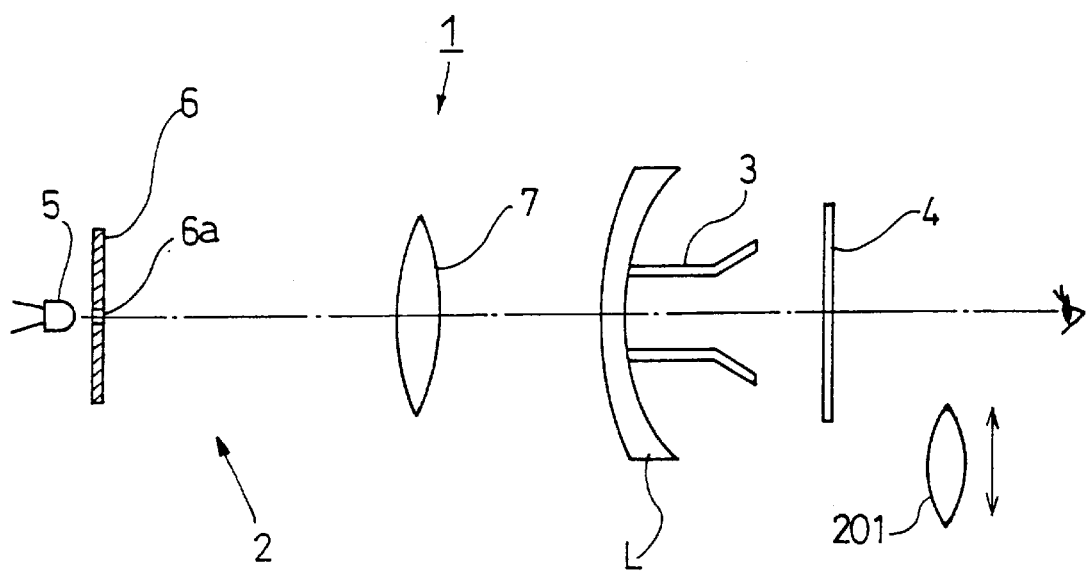
FIG. 1 is an optical layout diagram showing the optical system of a hidden-mark observing apparatus according to this invention.

In FIG. 1, reference numeral 1 denotes a hidden-mark observing apparatus. This hidden-mark observing apparatus 1 is made up of an optical illuminating system 2, a lens receiver 3 for receiving a progressive power lens (subject lens) L, and a screen 4. Note that the progressive power lens is a processed lens mounted in an eyeglass frame (not shown).

Figure 3:
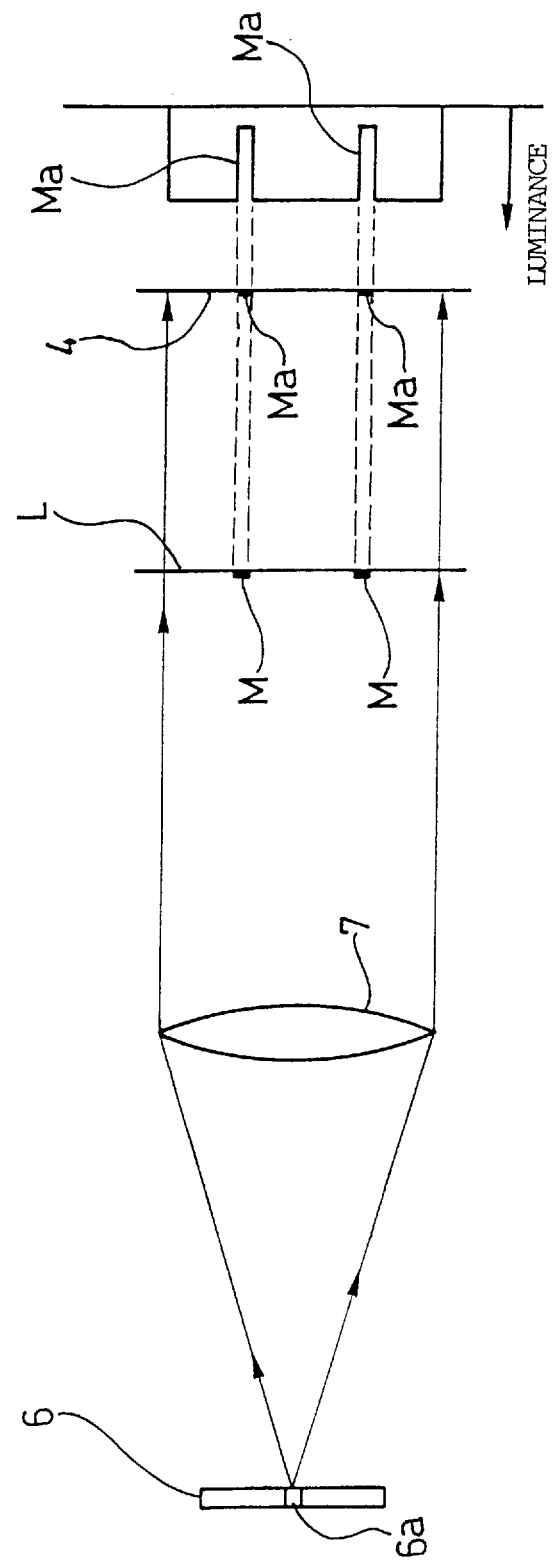
FIG. 3 is a diagram for explaining the clearness of the hidden marks.

The optical illuminating system 2 comprises a light source 5 such as a light-emitting diode (LED), a pinhole plate 6 with a pinhole 6a, and a collimator lens 7. The pinhole plate 6 is disposed at the front focal position of the collimator lens 7. An illuminating light beam emitted from the light source 5 arrives at the collimator lens 7 through the pinhole 6a of the pinhole plate 6, as shown in FIG. 3. The illuminating light beam is then collimated by the collimator lens 7, and the collimated light beam illuminates subject lens L. With the illumination by this collimated light beam, shadows on the subject lens L are projected on the screen 4.

Next, while observing the shadows projected on the screen 4 from the rear surface of the screen 4, the subject lens L is manually moved with respect to the lens receiver 3 so that the shadows of the hidden marks are projected onto the screen 4. As shown in FIG. 3, if the shadows Ma of the hidden marks are projected onto the screen 4, then the lens maker, the lens type, geometric center position, and the addition power of the subject lens L will be deciphered from the shadows Ma of the hidden marks. Note that reference character Mc is the shadow of a hidden mark representing a nose side.

Thus, since subject lens L is illuminated by a collimated light beam, the contrast of the shadow Ma of each hidden mark is enhanced and the shadows Ma become distinct. For this reason, the decipherment of the geometrical center position and the addition power of the subject lens L is easy and the discovery of the hidden marks also becomes easy.

Note that a magnifying lens 201 may also be placed behind the screen 4 to observe hidden marks.

In addition, in the case where the subject lens L has a flaw, a shadow due to the flaw will be projected onto the screen 4, and since the shadow, as with the aforementioned, will become distinct, a flaw in the subject lens L can be observed as a distinct shadow and the judgment of flaw existence in the subject lens L can be rendered easy.

In this embodiment, the light beam from the light source 5 has been collimated by the collimator lens 7, but even if the light beam were made into a diffused light beam or a converged light beam, it would not matter as long as the shadows Ma can be projected onto the screen 4.

Figure 4:
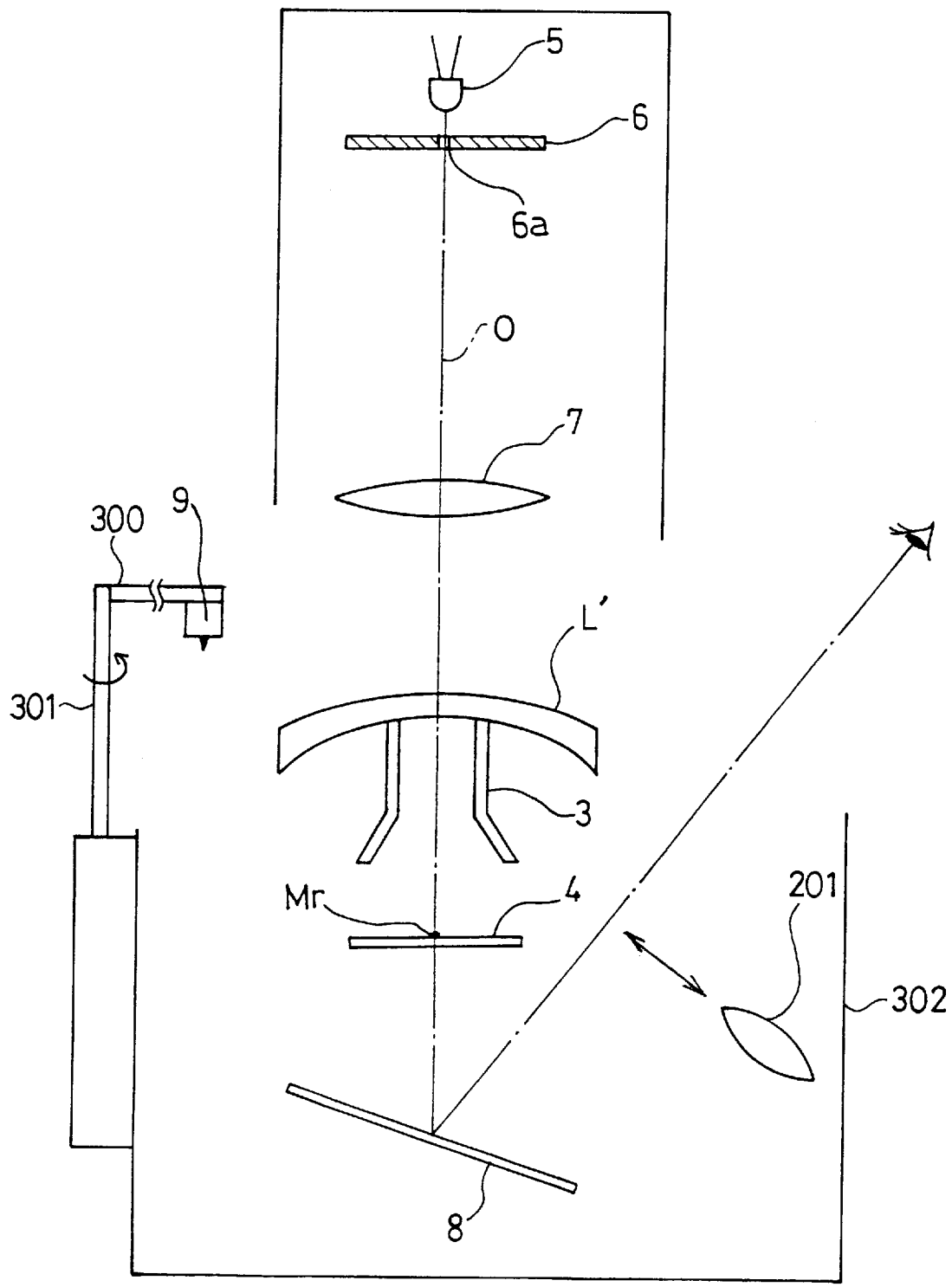
FIG. 4 is an explanatory diagram showing another example of a first embodiment of the present invention.

FIG. 4 illustrates another example of the first embodiment. In this example, when the hidden marks of an unprocessed lens L' are observed, marking can be performed on the unprocessed lens L'. Also, a mirror 8 is disposed under the screen 4 so that the lens L' and the screen 4 can be observed at the same time.

Figure 2:
FIG. 2 is an enlarged view showing the hidden marks projected on the screen of the hidden-mark observing apparatus shown in FIG. 1.

Reference numeral 9 denotes a marking member. In the case where marking is performed with this marking member 9, the circular mark Mb of the hidden marks Ma of the unprocessed lens L' (see FIG. 2) is aligned with an alignment mark Mx provided at the center position of the screen 4 and then marking is performed onto the circular mark Mb by the marking member 9.

The marking member 9 is attached through an arm member 300 to a rotational shaft 301, which is movable up and down with respect to a lower mirror cylinder 302. Also, the arm member 300 is rotatable on the rotational shaft 301 along with the rotational shaft 301. Reference numeral 303 indicates an upper mirror cylinder, which is connected to the lower mirror cylinder 302 by a coupling portion (not shown).

When marking is performed, the arm member 300 is first rotated, thereby positioning the marking member 309 to an optical axis O. The rotational shaft 301 is then moved downward and marking is performed. This marking can enhance positioning precision during a processing operation and save considerable time on numerous searches for hidden marks difficult to see while processing. Consequently, the processing time is shortened and non-recognition of hidden mark position can be prevented.

Also, the magnifying lens 201 may be placed behind the screen 4 to observe hidden marks.

(Second Embodiment)

Figure 5:
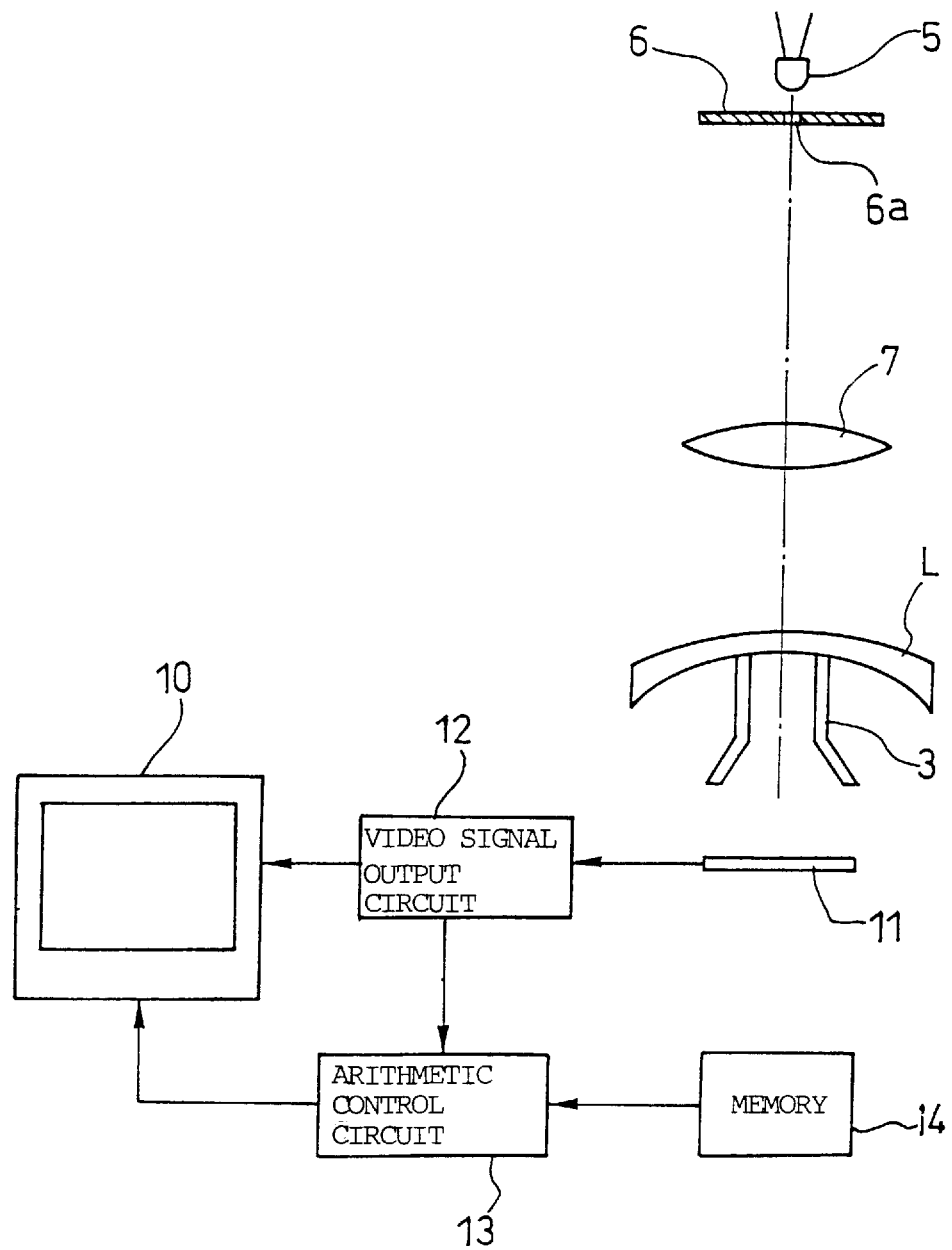
FIG. 5 is an explanatory diagram showing a second embodiment of the present invention.

FIG. 5 shows a second embodiment of the present invention. In the second embodiment, the shadows Ma of hidden marks are displayed on a monitor 10, and the maker, the type, the geometrical center position, and the addition power of subject lens L are obtained automatically from the shadows Ma. In FIG. 5, reference numeral 11 is a charge coupled device (CCD), 12 a video signal output circuit, 13 an arithmetic/control unit such as a central processing unit (CPU), and 14 a memory which stores various kinds of hidden marks and the corresponding lens makers. lens types, geometrical center positions, etc.

The arithmetic/control unit 13 extracts hidden marks from the video signal that is output from the video signal output circuit 12, and compares the extracted hidden marks with the data stored on the memory device 14, thereby judging the lens maker, lens type, lens reference position, and so on. The arithmetic/control unit also obtains the addition power from the numerical value (for example, 25 in FIG. 2) in the extracted hidden marks. The obtained results are displayed on the monitor 10. These results may also be printed out by a printer.

FIG. 6 illustrates another example of the second embodiment. In this example, a collimator lens 17 larger in diameter than that of the subject lens L is employed so that all shadows on the subject lens L can be displayed on the screen 4 at one time. Thus, there is no need to move the subject lens L.

In FIG. 6, reference numeral 15 is an image forming lens, which forms the images of the shadows projected on the screen 4 onto the CCD 11.

(Third Embodiment)

Figure 7:
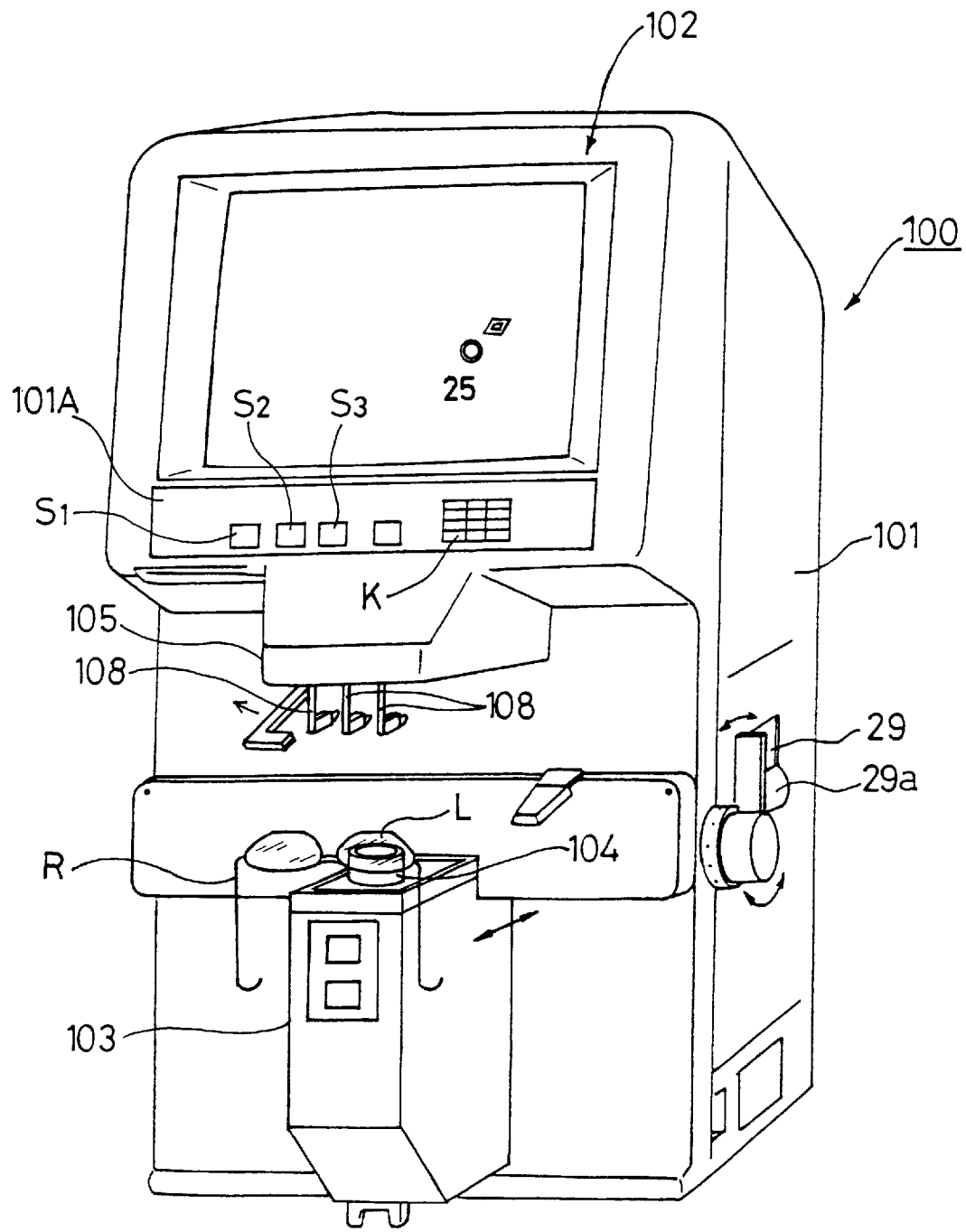
FIG. 7 is a perspective view showing a lens-meter according to a third embodiment of the present invention.

FIG. 7 shows a third embodiment of the present invention. In the third embodiment, hidden marks can be observed with a lens-meter.

In the figure, reference numeral 101 denotes the main body of a lens-meter 100. 102 is a monitor mounted on the front upper portion of the main body 101. 103 is a lower cage-shaped body provided on the front intermediate portion of the main body 101, and an optical measuring system is housed in the lower cage-shaped body 103. 104 is a truncated cone-shaped lens receiver (lens mounting portion) provided integrally on the top of the lower cage-shaped body 103, and 105 an upper cage-shaped body disposed above the lens receiver 104 and provided integrally on the main body 101.

Figure 8:
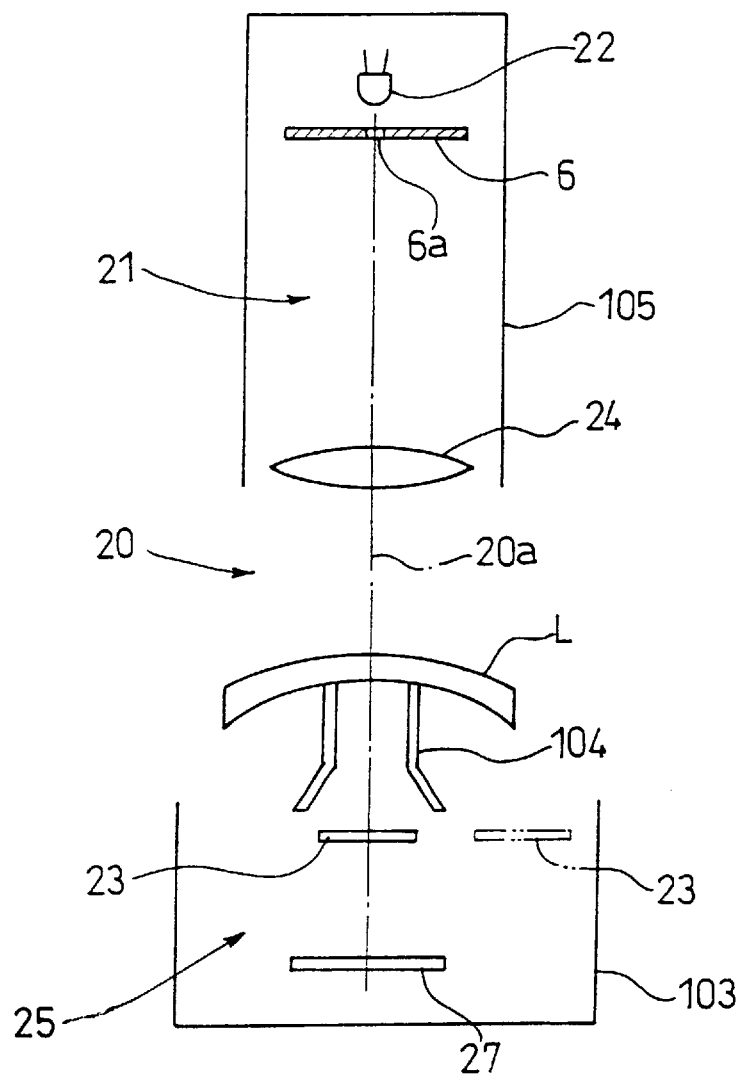
FIG. 8 is an optical layout diagram showing the optical system of the third embodiment.

Note that the optical center of the lens receiver 104 has become the optical center (optical axis of measurement) 20a of an optical measuring system 20 shown in FIG. 8. Also, an optical illuminating system 21 for irradiating a collimated illuminating light beam toward the lens receiver 104 is incorporated in the upper cage-shaped body 105.

The optical illuminating system 21 has a light source 22, a pinhole plate 6, and a collimator lens 24, and illuminates subject lens L with a collimated light beam. The pinhole plate 6 is disposed at the front focal position of the collimator lens 24.

Figure 24:
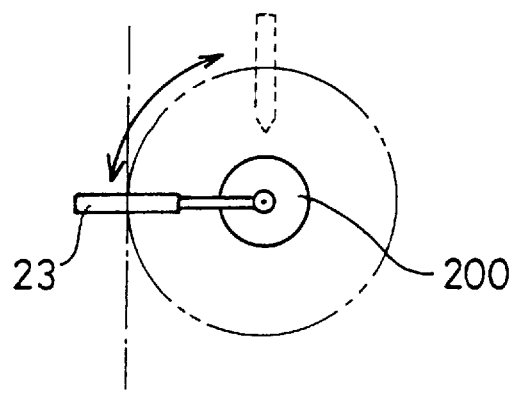
FIG. 24 is an explanatory diagram showing how the patterning plate shown in FIG. 8 is inserted into or removed from an optical path.

The lower cage-shaped body 103 has a light receiving system 25 incorporated therein. The light receiving system 25 has a patterning plate 23 and an area sensor 27 consisting of a CCD. The patterning plate 23 is constructed so as to be removed from or inserted into an optical path. The insertion/removal is performed, for example, by a motor 200 such as that shown in FIG. 24.

Figure 9:
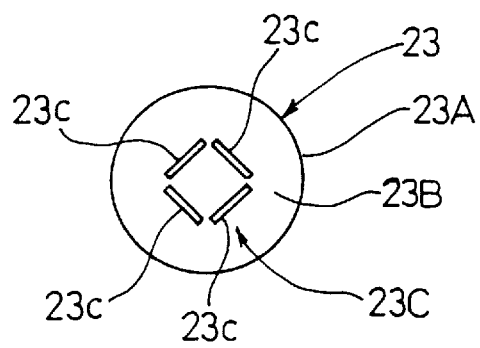
FIG. 9 is a plan view showing the patterning plate shown in FIG. 8.
Figure 25:
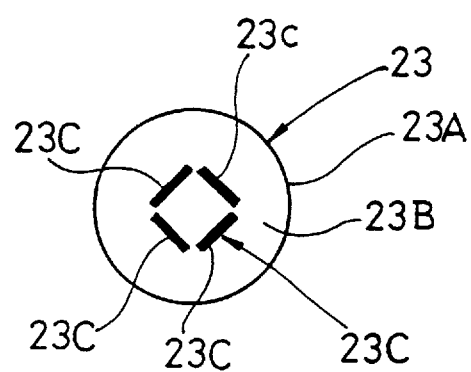
FIG. 25 is an explanatory diagram showing another example of the patterning plate shown in FIG. 8.

The patterning plate 23, as shown in FIG. 9, comprises a glass base 23A, which has a light shielding portion 23B and a transmitting portion 23C. The transmitting portion 23C is constituted by four patterning portions 23c forming four edges of a square. As shown in FIG. 25, it is also possible to use the transmitting portion 23C as a light shielding portion and the light shielding portion 23B as a transmitting portion.

The collimated light beam transmitted through the subject lens L is transmitted through the patterning portions 23c of the patterning plate 23 and arrives at the area sensor 27. As a consequence, the image of the square-shaped pattern is formed on the area sensor 27. Thus, the optical illuminating system 21 and the light receiving system 25 as a whole constitute the optical measuring system 20, which performs the measurements of the prism quantity and the refractive power of the subject lens L. In addition, the optical illuminating system 21 and the area sensor 27 make up a hidden-mark observing system for observing hidden marks.

When the patterning plate 23 is removed from the optical path, the shadows on the subject lens L are projected on the area sensor 27.

An automatic marking unit 30 is provided on the lower portion of the upper cage-shaped body 105. The automatic marking unit 30 is equipped with marking arms 108 which are rotated upward to a horizontal position by a solenoid (not shown) and a motor (not shown) which drives these marking arms 108 to move up and down. If the marking arms 108 are moved downward, the arms 108 will put suction-member mounting marks onto an unprocessed lens (not shown) mounted on the lens receiver 104.

A control portion 101A is provided on the lower portion of the main body 101 of the lens-meter. The control portion 100A is provided with mode switches S1 through S3 for setting various measuring modes and a plurality key switches K for performing input of various data and input of control commands.

The switch S1 is an observing mode one which sets an observing mode to observe the hidden marks on subject lens L. The switch S2 is a measuring mode switch which sets a measuring mode to measure the optical characteristics of subject lens L. The switch S3 sets a marking mode to automatically perform marking when subject lens L is measured.

Additionally, the main body 101 of the lens-meter 101 has a printer 29 incorporated therein, which prints the results of measurement and observation on recording paper 29a.

Figure 10:
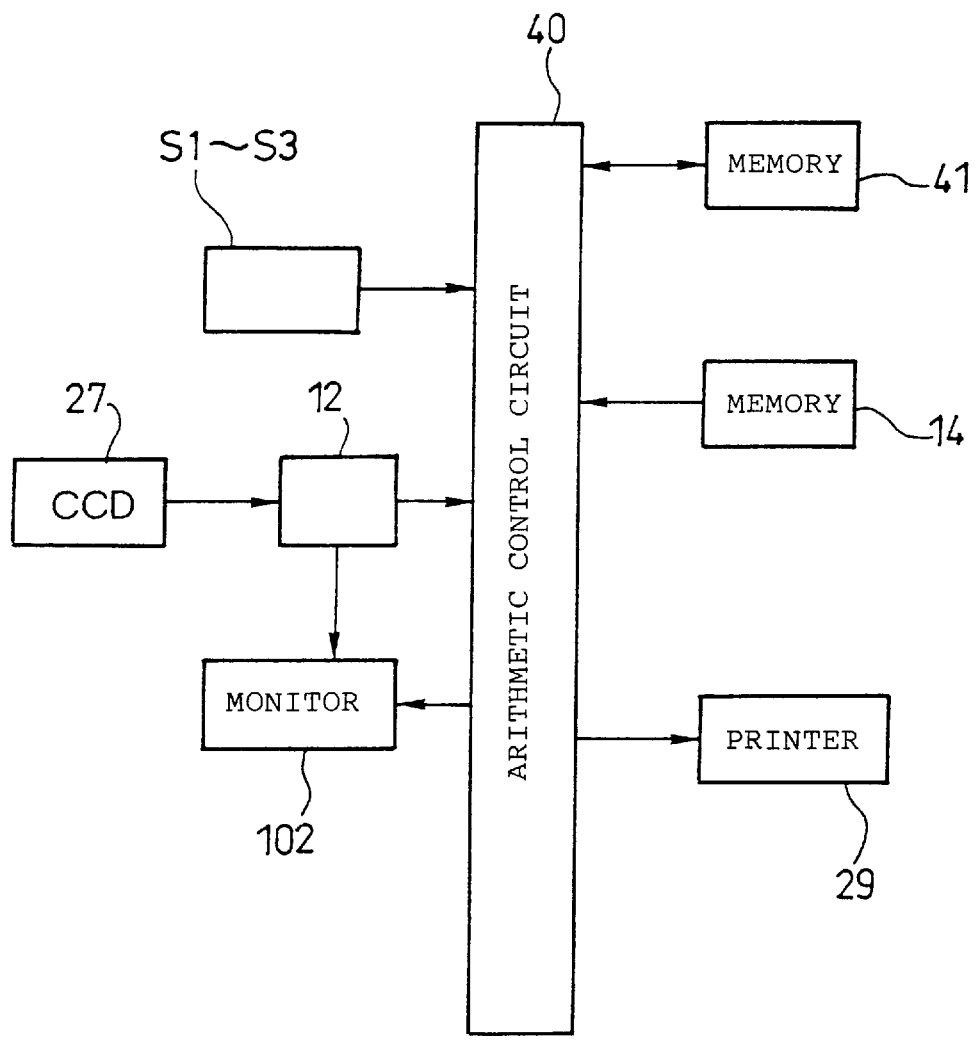
FIG. 10 is a block diagram showing the control system of the lens-meter according to the third embodiment.

FIG. 10 shows a block diagram of the control system of the lens-meter. In the figure, reference numeral 40 denotes an arithmetic/control circuit (arithmetic means) constituted by a CPU, etc. When the measuring mode has been set, the arithmetic/control circuit 40 computes lens characteristics, such as the prism quantity and the refractive power of subject lens L, based on the video signal that is output from a video signal output circuit 12. The result of the computation is stored on memory (storage means) 41.

Also, when the observing mode has been set, the arithmetic/control circuit 40 extracts hidden marks from the video signal output by the video signal output circuit 12. From the extracted hidden marks the arithmetic/control circuit 40 obtains the maker, the type, and the geometric center position of the lens, based on the hidden marks stored in the memory 14. In addition, the arithmetic/control circuit 40 obtains the addition power from the numerical value in the extracted hidden marks. Furthermore, the arithmetic/control circuit 40 causes the monitor 10 to display these obtained results and the printer 29 to print out them.

The shadows of the hidden marks and the images of the patterns projected on the area sensor 27 are also displayed on the monitor 102.

A description will now be given of the operation of the aforementioned lens-meter.

When hidden marks are observed, the subject lens L of eyeglasses R is mounted on the lens receiver 104 as shown in FIG. 7, then power is turned on by a main switch (not shown), and the switch S1 is turned on. If the switch S1 is turned on, the observing mode will be set and the patterning plate 23 will be removed from the optical path.

On the other hand, since power to the lens-meter has been turned on, the light source 22 of the optical measuring system 20 is lit. The illuminating light beam emitted from the light source 22 arrives at the collimator lens 24 through the pinhole 6a of the pinhole plate 6. The illuminating light beam is collimated by the collimator lens 24, and the collimated light beam illuminates the subject lens L. With the illumination by this collimated light beam, the shadows on the subject lens L are projected onto the area sensor 27. The images of the projected shadows are displayed on the monitor 102. Then, the eyeglasses R is moved with respect to the lens receiver 104, and if the shadows of the hidden marks on the subject lens L are projected onto the area sensor 27, the images of the shadows of the hidden marks will be displayed on the monitor 102, as shown in FIG. 7.

Even in this embodiment, since the shadows of the hidden marks projected onto the area sensor 27 become clear, the hidden marks can be observed as clear shadows with the monitor 102, and consequently, the decipherment of hidden marks can be rendered simple. In addition, because a flaw in a subject lens can be observed as a clear shadow, the judgment of flaw existence in a subject lens becomes easy.

On the other hand, the arithmetic/control circuit 40 extracts hidden marks from the video signal output by the video signal output circuit 12. From the extracted hidden marks, the lens maker, lens type, and the lens's geometric center position are obtained based on the hidden marks stored in the memory 14. Furthermore, the addition power is obtained from the numerical value in the extracted hidden marks. These obtained results are displayed on the monitor 102 Also, with key manipulation, the obtained results are printed out by the printer 29.

When the optical characteristics of subject lens L are measured, the switch S2 is turned on, thereby setting the measuring mode. With the setting of the measuring mode, the patterning plate 23 is inserted into the optical path, The illuminating light beam transmitted through the subject lens L is transmitted through the patterning portion 23C of the patterning plate 23 and arrives at the area sensor 27. The images of the patterns in the patterning portion 23C of the patterning plate 23 are formed onto the area sensor 27. The arithmetic/control circuit 40 computes the spherical degree S of the unprocessed lens, based on the video signal output by the video signal output circuit 12. The computed spherical degree S, the cylindrical degree C, and the axial angle degree A are stored on the memory 41. Also, they are displayed on the monitor 102 and printed out by the printer 29, thereby completing the measurement.

In the case where the switch S3 has been turned on and the marking mode has been set, marking is performed after measurement by the automatic marking unit 30. In the case where subject lens L is an unprocessed lens with a single focus, the center portion of the unprocessed lens is aligned beforehand with the center of the lens receiver 104.

In the case where marking is performed on the circular mark M$b$ (see FIG. 2) of the hidden marks of an unprocessed lens, this circular mark M$b$ is aligned with the center of the lens receiver 104, while viewing the monitor 102, and a predetermined key K is manipulated. This causes the central marking arms 108 alone to operate, and marking is performed onto the circular mark M$b$.

In the aforementioned embodiment, although the patterning plate 23 is removed from the optical path when hidden marks are observed, the patterning plate 23 may also be constituted by a liquid crystal shutter. In this case, by opening the liquid crystal shutter and bringing the whole surface thereof into a transmissible state when observing hidden marks, there will be no need to remove the patterning plate 23 from the optical path. Because structure for inserting or removing the patterning plate 23 is rendered unnecessary, structure becomes simple. Note that only the patterning portion 23C of the patterning plate 23 is brought into a transmissible state when measuring optical characteristics.

(Fourth Embodiment)

Figure 11:
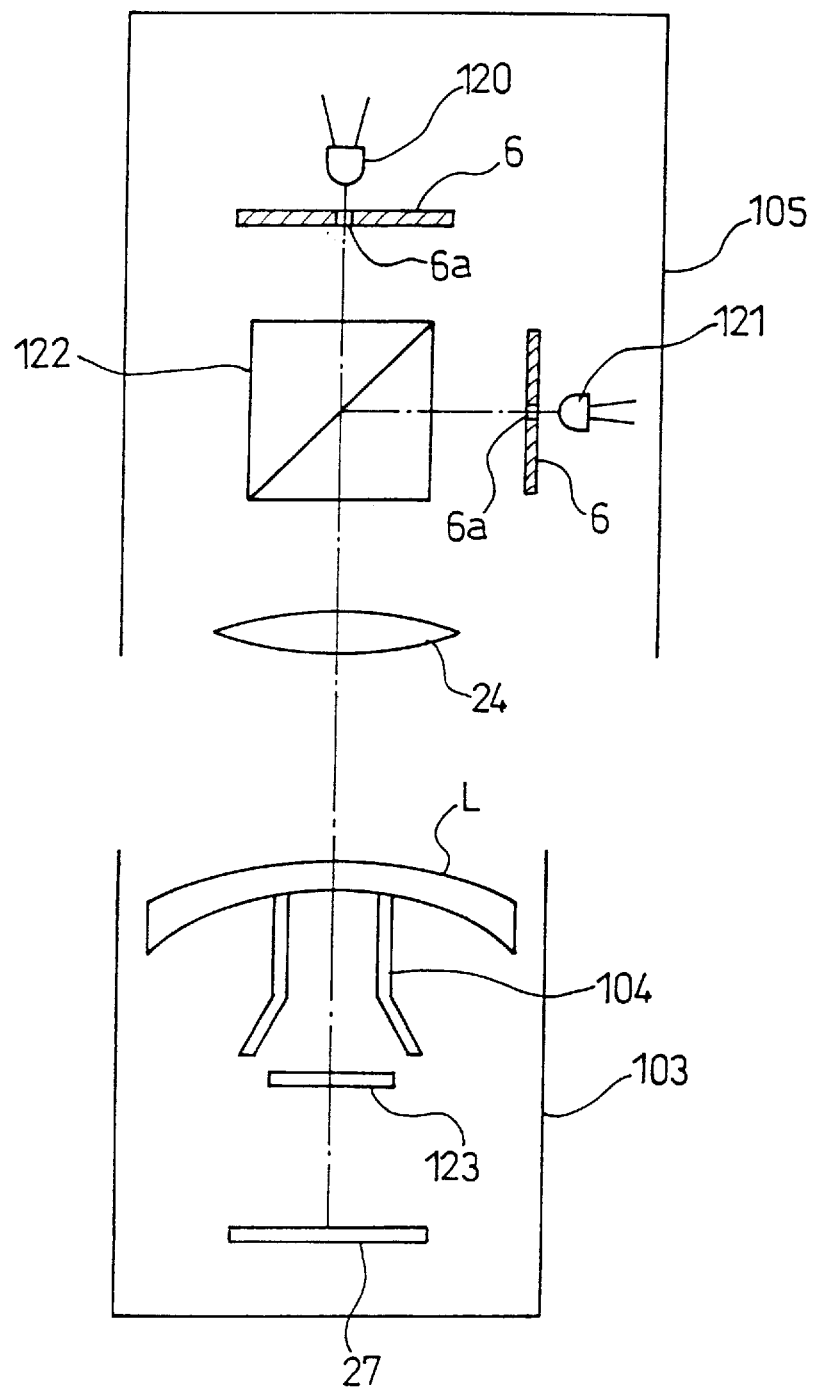
FIG. 11 is an explanatory diagram showing a fourth embodiment of the present invention.

FIG. 11 shows a fourth embodiment of the present invention. This fourth embodiment is characterized in that the observation of hidden marks and the measurement of the optical characteristics of a subject lens can be performed without moving a patterning plate 123.

In FIG. 11, reference numeral 120 is an LED which emits light of first wavelength $\beta$, 121 an LED which emits light of second wavelength $\alpha$, 122 a dichroic prism which transmits the first wavelength $\beta$ and reflects the second wavelength $\alpha$, and 123 a patterning plate.

Figure 12:
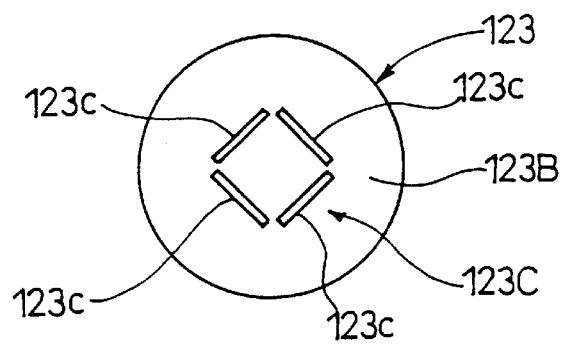
FIG. 12 is a plan view showing the patterning plate shown in FIG. 11.
Figure 13:
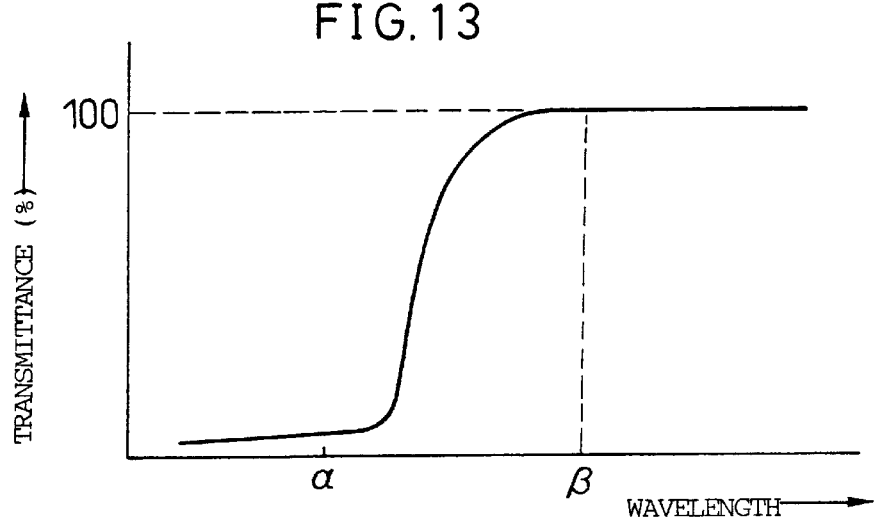
FIG. 13 is a graph showing the characteristics of the patterning plate and the dichroic mirror.

In the patterning plate 123, as shown in FIG. 12, the light shielding portion 123B is constituted by a dichroic mirror which transmits only the first wavelength $\beta$ and reflects the second wavelength $\alpha$, and the patterning portion 123C is constituted of four transmitting portions 123$c$ which transmit both the first and second wavelengths $\beta$ and $\alpha$. The transmittances of the dichroic mirror and the dichroic prism 122 with respect to wavelength become as shown in FIG. 13.

When hidden marks are observed, the LED 120 alone is lit. The illuminating light beam of first wavelength β emitted from the LED 122 arrives at the collimator lens 24 through the pinhole 6a of the pinhole plate 6 and the dichroic prism 122. The illuminating light beam is collimated by the collimator lens 24, and the collimated light beam illuminates the subject lens L. Then, the illuminating light beam transmitted through the subject lens L reaches the patterning plate 123.

Because the illuminating light beam comprises first wavelength β, it is transmitted through the light shielding portion 123B and the patterning portion 123C of the patterning plate 123. The transmitted illuminating light beam reaches the area sensor 27, and the shadows on the subject lens L are projected onto the area sensor 27. Thereafter, the hidden marks are displayed on the monitor 102 (see FIG. 7), and the lens maker, lens type, geometric center position, and the addition power are obtained.

In the case where the lens characteristics of subject lens L are measured, only the LED 121 is lit. The illuminating light of second wavelength α emitted from the LED 121 is transmitted through the pinhole 6a of the pinhole plate 6. The transmitted light beam is then reflected by the dichroic prism 122 and arrives at the collimator lens 24. The collimated light beam from the collimator lens 24 illuminates the subject lens L. Next, the illuminating light beam transmitted through the subject lens L arrives at the patterning plate 123.

Since the illuminating light beam comprises second wavelength α, it is transmitted through only the patterning portion 123C of the patterning plate 123 and arrives at the area sensor 27. The images of the patterns in the patterning portion 123C are then formed on the area sensor 27, and the lens characteristics will be measured.

Note that when hidden marks are observed, there is no harm even when both the LEDs 120 and 121 have been lit.

Figure 14:
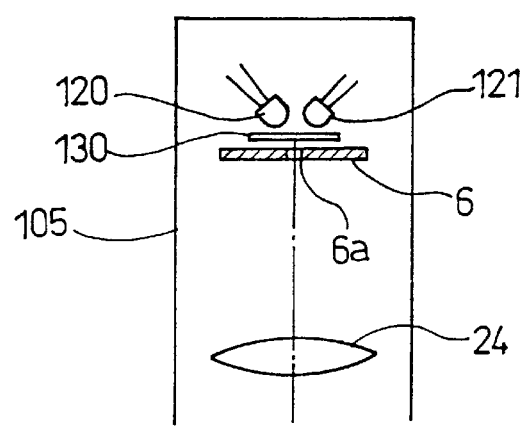
FIG. 14 is an explanatory diagram showing another example of the fourth embodiment.
Figure 15:
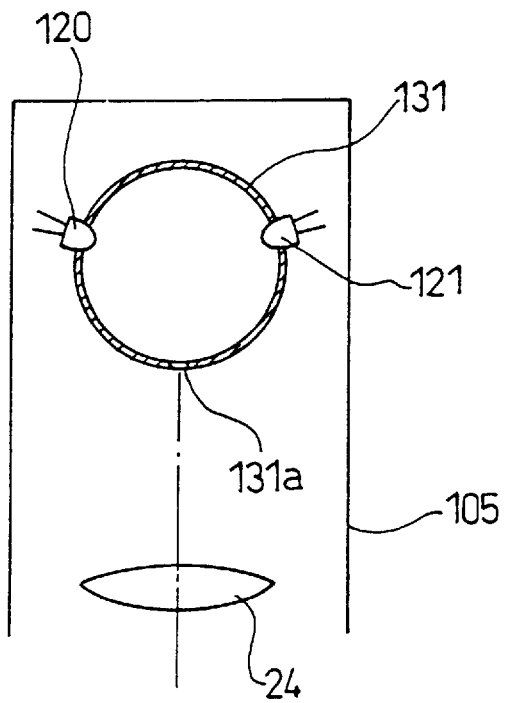
FIG. 15 is an explanatory diagram showing still another example of the fourth embodiment.
Figure 16:
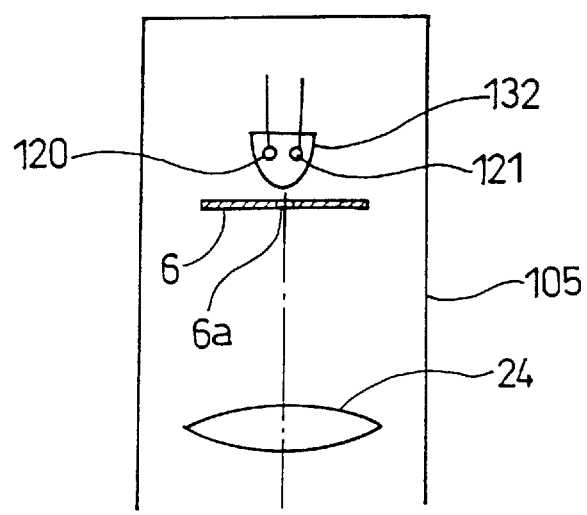
FIG. 16 is an explanatory diagram showing a further example of the fourth embodiment.

FIGS. 14 through 16 illustrate examples of the case where the dichroic prism 122 is omitted. In the example illustrated in FIG. 14, the LEDs 120 and 121 are disposed at the same position behind the pinhole plate 6 and a diffusing plate 130 is interposed between the LEDs 120 and 121 and the pinhole plate 6.

In the example illustrated in FIG. 15, the LEDs 120 and 121 are attached to an integrating sphere body 131 with a pinhole 131a.

In the example illustrated in FIG. 16, the two LEDs 120 and 121 are housed in a single element 132.

(Fifth Embodiment)

Figure 17:
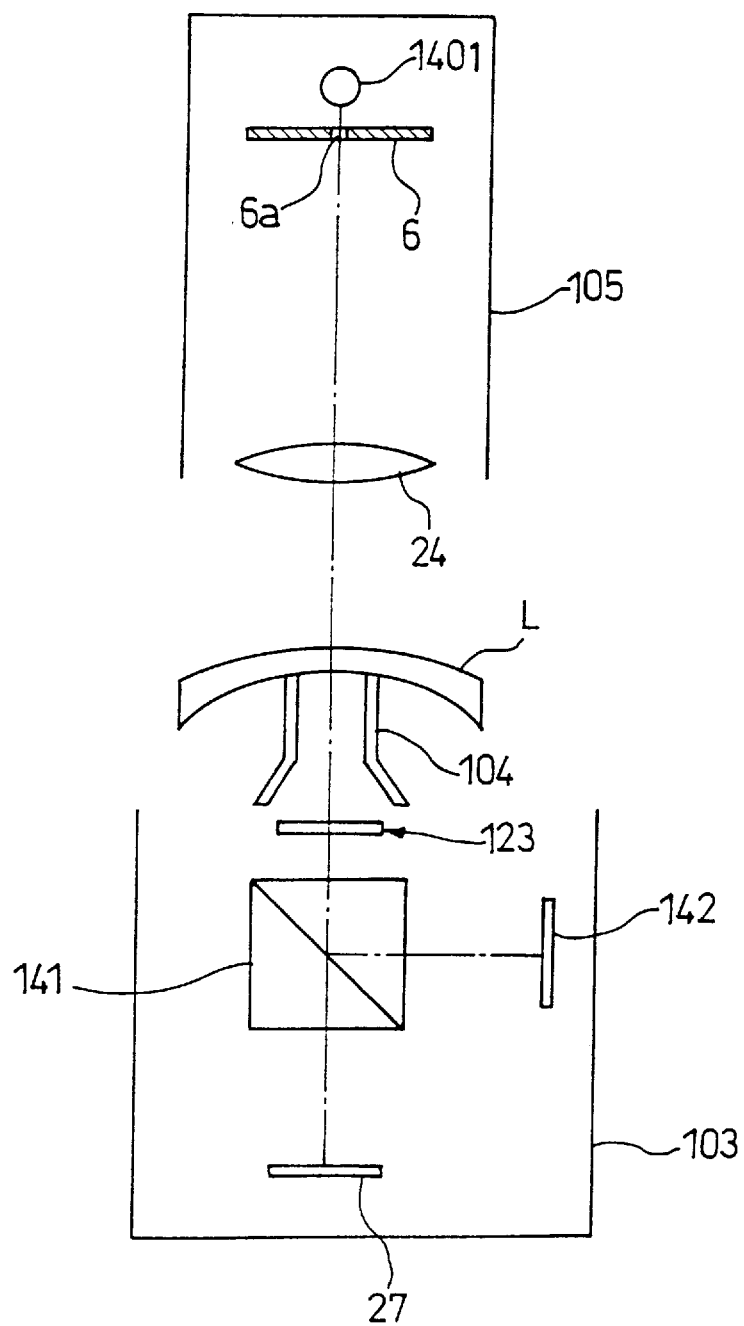
FIG. 17 is an explanatory diagram showing a fifth embodiment of the present invention.

FIG. 17 shows a fifth embodiment of the present invention. The fifth embodiment is characterized in that the observation of hidden marks and the measurement of the optical characteristics of the subject lens L can be performed at the same time with a single light source. In the figure, reference numeral 1401 denotes a tungsten halogen lamp which emits light including at least first and second wavelengths β and α, 141 a dichroic prism which transmits light of first wavelength β and reflects light of second wavelength α, and 142 an area sensor comprising a CCD.

An illuminating light beam emitted from the halogen lamp 1401 arrives at the collimator lens 24 through the pinhole 6a of the pinhole plate 6. The illuminating light beam is then collimated by the collimator lens 24 and illuminates the subject lens L. Next, the illuminating light beam transmitted through the subject lens L illuminates the patterning plate 123.

The illuminating light beam of first wavelength β is transmitted through the light shielding portion 123B and the patterning portion 123C of the patterning plate 123. The transmitted light beam arrives at the area sensor 27 through the dichroic prism 141, and the shadows on the subject lens L are projected onto the area sensor 27. The hidden marks are displayed on the aforementioned monitor 102 (see FIG. 7), and the lens maker, lens type, geometric center position, and the addition power are obtained.

On the other hand, the illuminating light beam of second wavelength α is transmitted through the patterning portion 123C of the patterning plate 123. The transmitted light beam is reflected by the dichroic prism 141 and arrives at the area sensor 142. The images of the patterns in the patterning portion 123C are then projected onto the area sensor 143, and the lens characteristics of the subject lens L will be measured.

(Sixth Embodiment)

Figure 18:
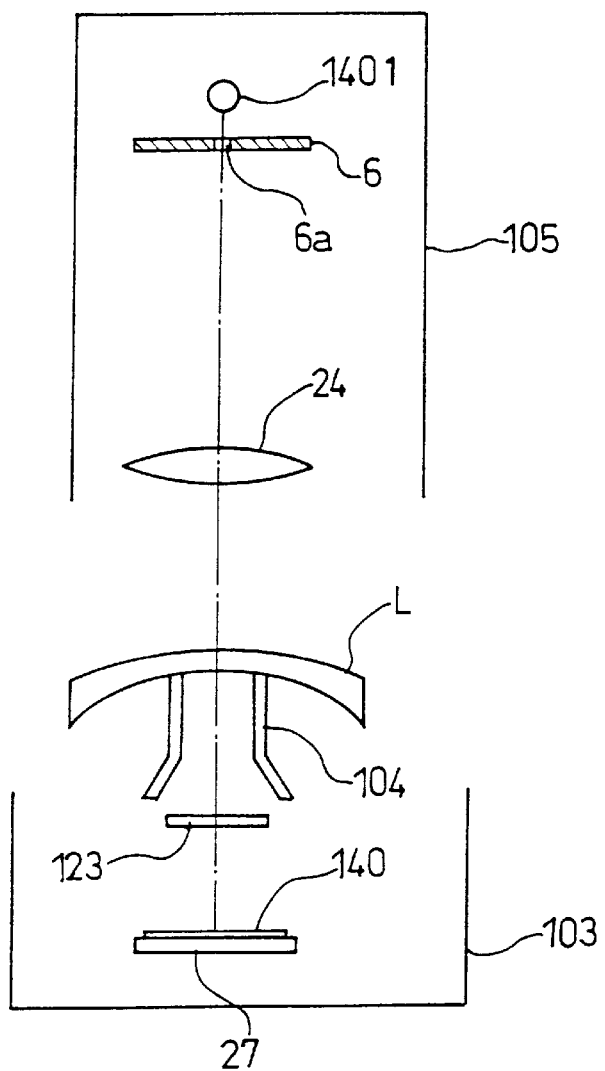
FIG. 18 is an explanatory diagram showing a sixth embodiment of the present invention.
Figure 19:
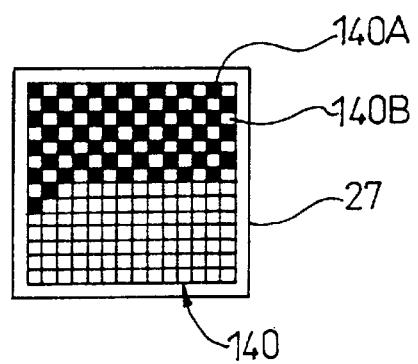
FIG. 19 is an explanatory diagram of the filter shown in FIG. 18.

FIG. 18 shows a sixth embodiment of the present invention. In the sixth embodiment, the observation of hidden marks and the measurement of lens characteristics can be simultaneously performed with a single area sensor 27. In the figure, reference numeral 140 is a filter stuck on the area sensor 27. This filter 140, as shown in FIG. 19, consists of first filters 140A which transmit only light of first wavelength β and second filters 140B which transmit only light of second wavelength α. The filters 140A and 140B are disposed checkerwise.

The sixth embodiment is characterized in that hidden marks are obtained from the pixels of the area sensors 27 corresponding to the first filters 140A and that lens characteristics are obtained from the pixels of the area sensors 27 corresponding to the second filters 140B.

(Seventh Embodiment)

Figure 20:
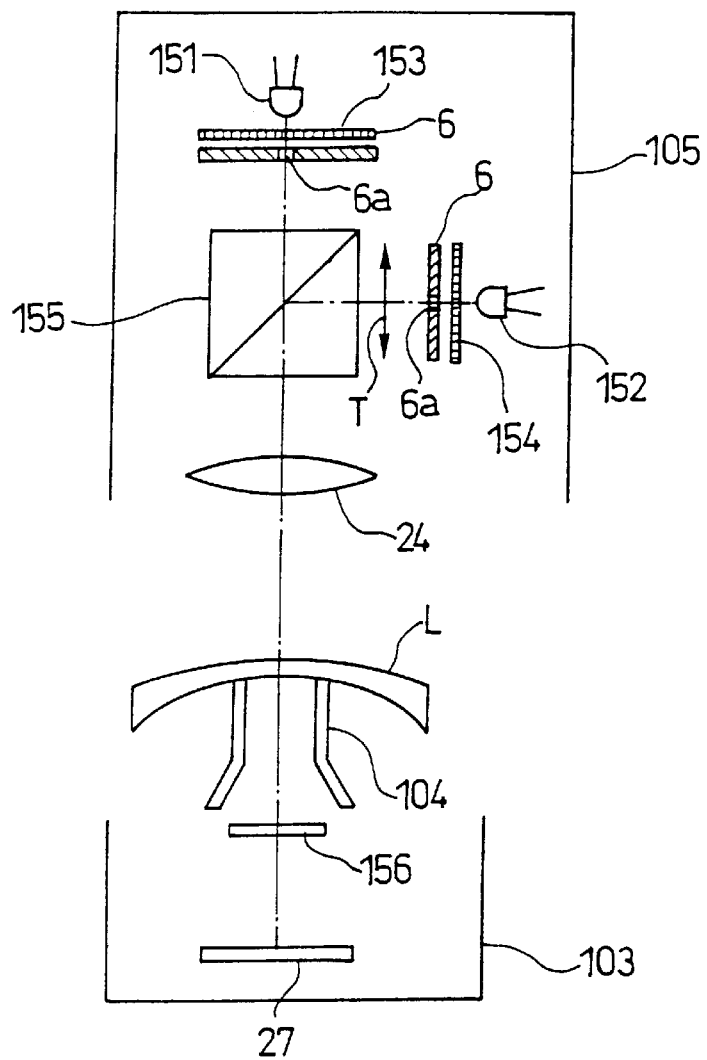
FIG. 20 is an explanatory diagram showing a seventh embodiment of the present invention.

FIG. 20 shows a seventh embodiment of the present invention. In the figure, reference numerals 151 and 152 are LEDs that transmit light of the same wavelength. 153 is a polarizing plate that transmits only a light beam polarized linearly in a direction perpendicular to a paper surface, 154 a polarizing plate that transmits only a light beam polarized linearly in a direction of arrow T, 155 a beam splitter that transmits a light beam polarized linearly in the same direction as the polarizing plate 151 and also reflects a light beam polarized linearly in the direction of arrow T, and 156 a patterning plate.

Figure 21:
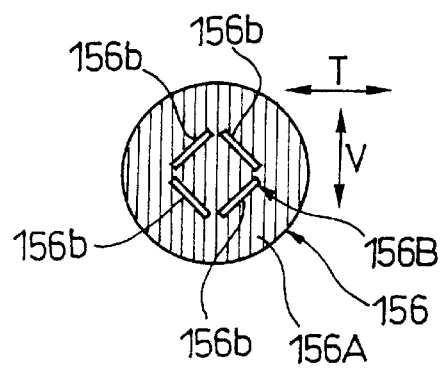
FIG. 21 is an explanatory diagram of the patterning plate shown in FIG. 20.

The patterning plate 156, as shown in FIG. 21, is constituted of a light shielding portion 156A which transmits only a light beam polarized linearly in a direction of arrow V (in FIG. 20 a direction perpendicular to a paper surface) and a transmitting portion 156B which transmits a light beam regardless of a direction of polarization. The transmitting portion 156B comprises four patterning portions 156b.

When hidden marks are observed, the LED 151 is lit. The illuminating light beam emitted from the LED 151 is polarized linearly in a direction perpendicular to a paper surface and is transmitted through the polarizing plate 153 and arrives at the collimator lens 24 through the pinhole 6a of the pinhole plate 6 and the beam splitter 155. The illuminating light beam is collimated by the collimator lens 24 and illuminates the subject lens L. Thereafter, the illuminating light beam transmitted through the subject lens L illuminates the patterning plate 156.

Since the light shielding portion 156A of the patterning plate 156 transmits only the light beam polarized linearly in the direction of arrow V, the aforementioned illuminating light beam is transmitted through the patterning plate 125. The transmitted light beam reaches the area sensor 27, and the shadows on the subject lens L are projected onto the area sensor 27. Thereafter, the hidden marks are displayed on the monitor 102 (see FIG. 7), and the lens maker, lens type, geometric center position, and the addition power are obtained.

When the lens characteristics of the subject lens L are measured, the LED 152 alone is lit. The illuminating light beam emitted from the LED 152 is linearly polarized in the direction of arrow T by the polarizing plate 154. The linearly polarized light beam arrives at the collimator lens 24 through the pinhole 6a of the pinhole plate 6 and the beam splitter 155. The illuminating light beam is then collimated by the collimator lens 24. The collimated light beam illuminates the subject lens L. Next, the illuminating light beam transmitted through the subject lens L illuminates the patterning plate 156.

Because the light shielding portion 156A of the patterning plate 156 transmits only the light beam polarized linearly in the direction of arrow V, the aforementioned illuminating light beam is shut out by the light shielding portion 156A of the patterning plate 156 and is transmitted only through the patterning portions 156b. The illuminating light beam transmitted through the patterning portions 156b reaches the area sensor 27, and the images of the patterns in the patterning portions 156b are projected onto the area sensor 27. As a result, the optical characteristics of the subject lens L can be measured.

Note that when hidden marks are observed, there is no problem even when the LED 152 has been lit.

(Eighth Embodiment)

Figure 22:
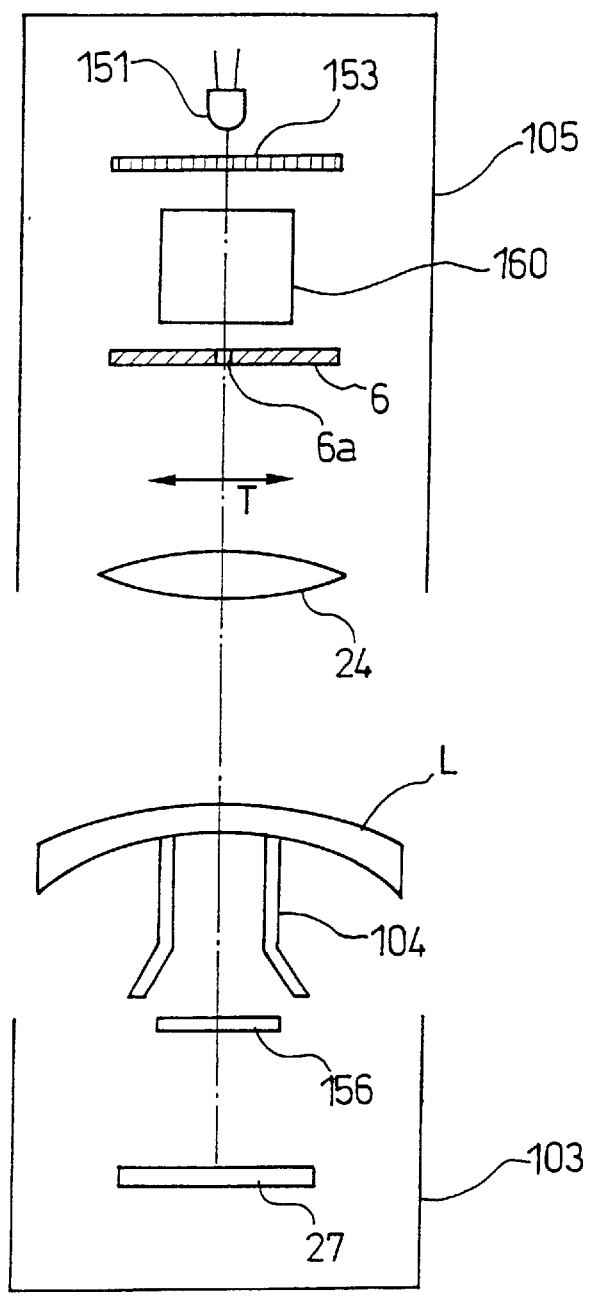
FIG. 22 is an explanatory diagram showing an eighth embodiment of the present invention.
Figure 23:
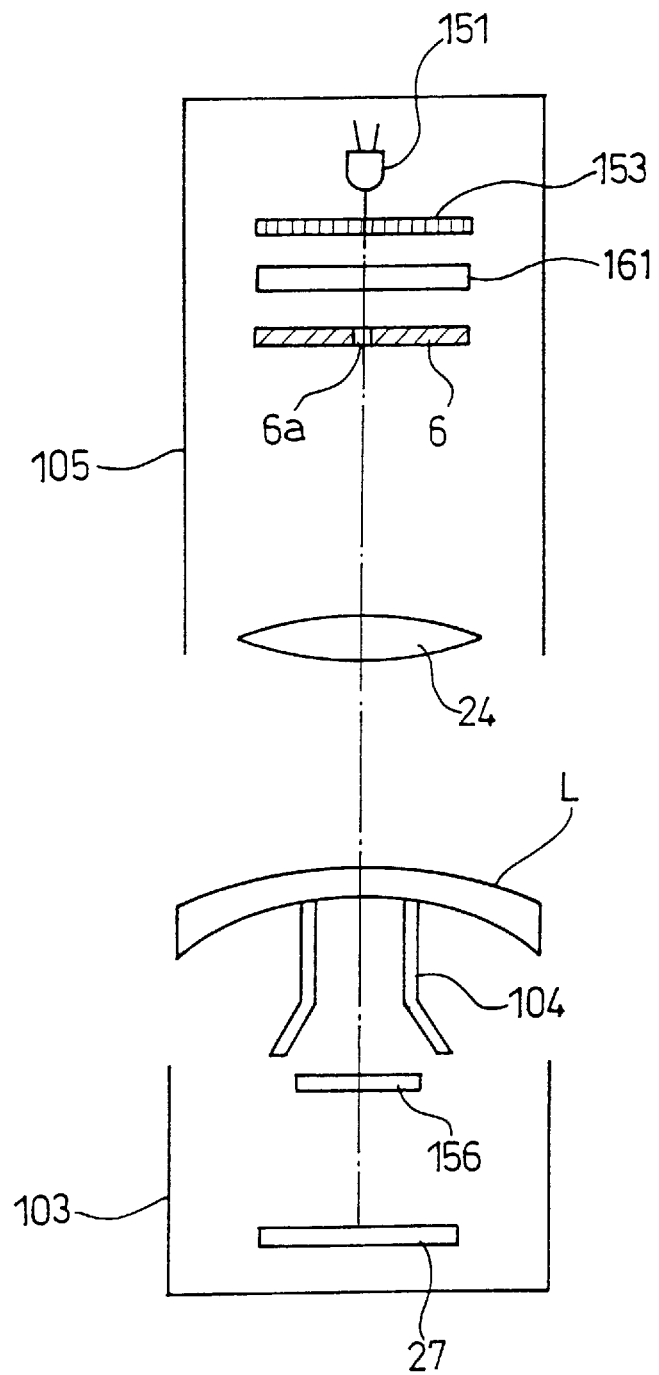
FIG. 23 is an explanatory diagram showing another example of the eighth embodiment.

FIG. 22 shows an eighth embodiment of the present invention. In the eighth embodiment, the observation of hidden marks and the measurement of the optical characteristics of subject lens L can be performed without using the aforementioned beam splitter 155 and rather with a single LED 151 and a single polarizing plate 153. In FIG. 22, reference numeral 160 denotes an optical Faraday element which causes the polarization direction of linearly polarized light to rotate 90° by application of a magnetic field.

In the case where hidden marks are observed, a magnetic field is not applied to the Faraday element 160. The illuminating light beam emitted from an LED 151 is linearly polarized by the polarizing plate 153. The linearly polarized light beam is transmitted through the Faraday element 160 without rotating the polarization direction. The transmitted light beam is transmitted through the pinhole 6a of a pinhole plate 6 and is collimated by a collimator lens 24. The collimated light beam illuminates the subject lens L. As with the seventh embodiment, the shadows on the subject lens L are projected on an area sensor 27, and the hidden marks are displayed on the aforementioned monitor (see FIG. 7).

In the case where the optical characteristics of the subject lens L are observed, a magnetic field is applied to the Faraday element 160. Therefore, the linearly polarized light beam transmitted through the Faraday element 160 is rotated 90° and polarized in a direction of arrow T. The illuminating light beam polarized in the direction of arrow T, as with the seventh embodiment, is shut out by the light shielding portion 156A of the patterning plate 156 and is transmitted only through the patterning portion 156B. In this way, the images of the patterns in the patterning portion 156B are projected onto the area sensor 27, and the optical characteristics of the subject lens L are measured.

Fig, 23 illustrates another example of the eighth embodiment. In this example, a liquid crystal panel 161 is employed instead of employing the Faraday element 160. By applying voltage to the liquid crystal panel 161, the polarization direction of linearly polarized light is rotated 90°.

Even in the fourth through the eighth embodiments, hidden marks can be observed as distinct shadows with the monitor 102 and the decipherment of hidden marks becomes simple. In addition, because a flaw in a subject lens can be observed as a clear shadow, the judgment of flaw existence in a subject lens is facilitated.

(Ninth Embodiment)

Figure 26:
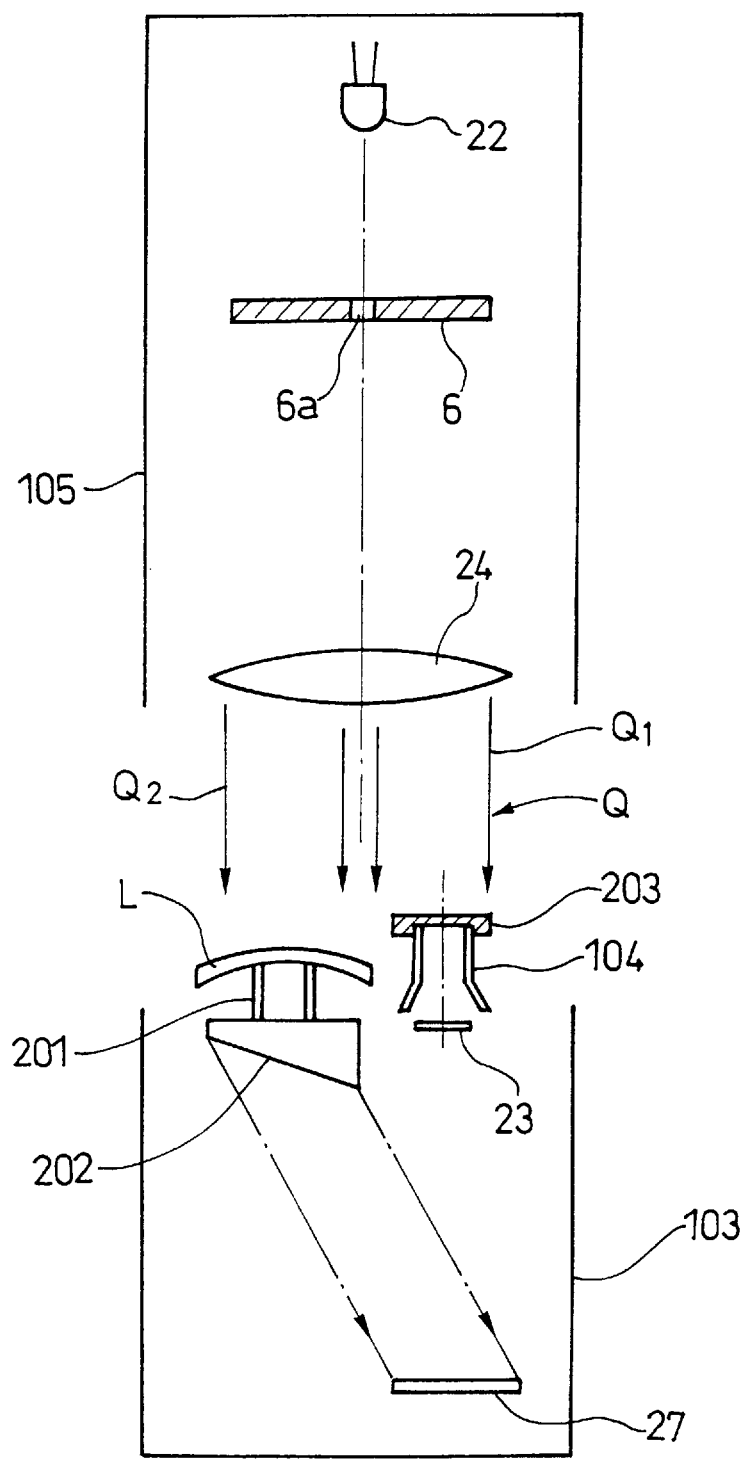
FIG. 26 is an optical layout diagram showing an optical system according to a ninth embodiment of the present invention.

FIG. 26 shows a ninth embodiment of the present invention. In the ninth embodiment, an optical path Q for a collimated light beam is divided into a first optical path Q1 for measuring optical characteristics and a second optical path Q2 for observing the hidden marks of the subject lens L. For this purpose, a first lens receiver 104, a patterning plate 23, and the an area sensor 27 are disposed within the first optical path S1, and a second lens receiver 201 and a prism 202 are disposed within the second optical path Q2. The prism 202 is used for guiding the light beam transmitted through subject lens L to the area sensor 27.

Reference numeral 203 denotes a cap, which is detachably mounted on the first lens receiver 104. This cap 203 can also be mounted on the second lens receiver 201. When hidden marks are observed, the cap 203 is mounted on the first lens receiver 104 to shut out the light beam in the first optical path Q1. When the lens characteristics of the subject lens L are measured, the cap 203 is mounted on the second lens receiver 201 to shut out the light beam in the second optical path Q2.

In the case where hidden marks are observed, as shown in FIG. 26, subject lens L is placed on the second lens receiver 201 and the cap 203 is mounted on the first lens receiver 104. Therefore, the light beam in the first optical path Q1 is shut out by the cap 203.

If the subject lens L is illuminated by the collimated light beam in the second optical path Q2, then the shadows of hidden marks or the shadow of a flaw in the subject lens L, along with the shadow of the subject lens L, will be projected onto the area sensor 27 through the prism 203 by the illumination of the collimated light beam. Next, the shadows of the hidden marks or the shadow of a flaw is displayed on the aforementioned monitor 102 (see FIG. 7) along with the shadow of the subject lens L, and these shadows are observed.

The measurement of the lens characteristics of the subject lens L is performed by mounting the cap 203 on the second lens receiver 201 and placing the subject lens L on the first lens receiver 104.

Figure 27:
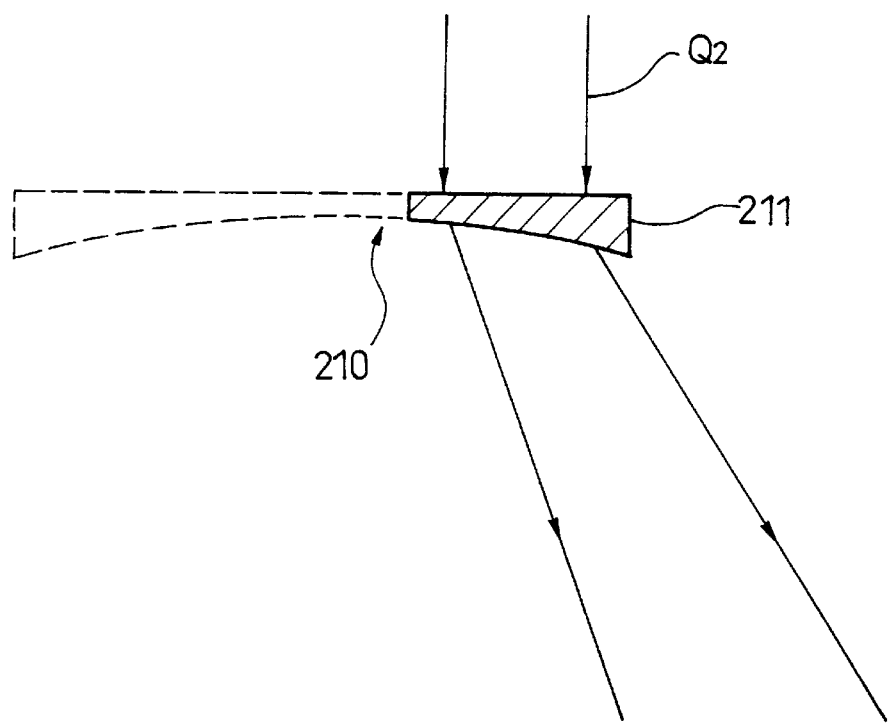
FIG. 27 is an explanatory diagram showing another example of the ninth embodiment.

In the ninth embodiment, while the shadows of the subject lens L and the like have been guided as collimated light beams to the area sensor 27 by means of the prism 202, these shadows may also be enlarged by employing a portion 211 of a concave lens 210 instead of employing the prism 202, as shown in FIG. 27.

(Tenth Embodiment)

Figure 28:
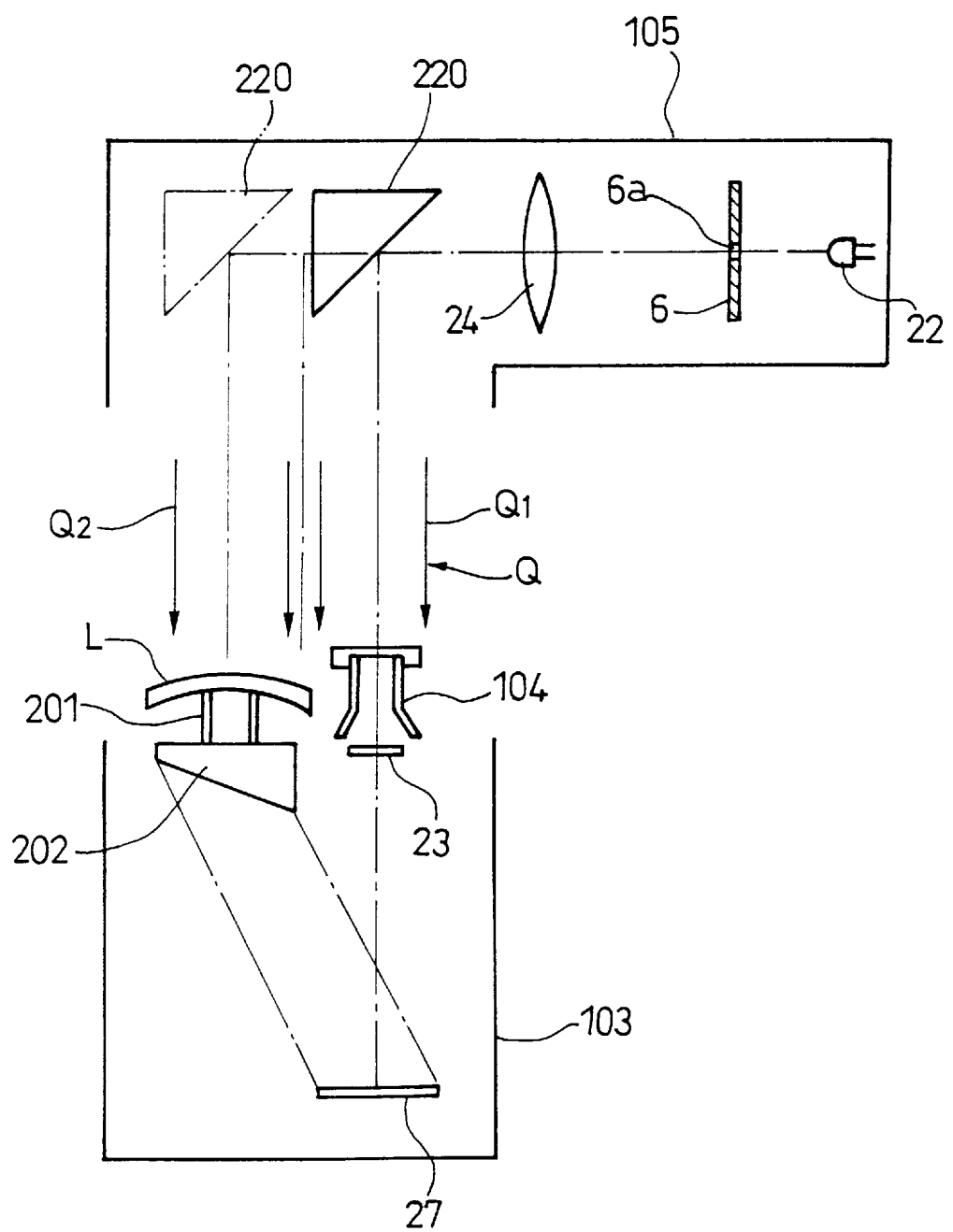
FIG. 28 is an optical layout diagram showing an optical system according to a tenth embodiment of the present invention.

FIG. 28 shows a tenth embodiment of the present invention. In the tenth embodiment, the position of a mirror 220 is switched to guide the light beam collimated by the collimator lens 24 to either a first optical path Q1 or a second optical path Q2.

(Eleventh Embodiment)

Figure 29:
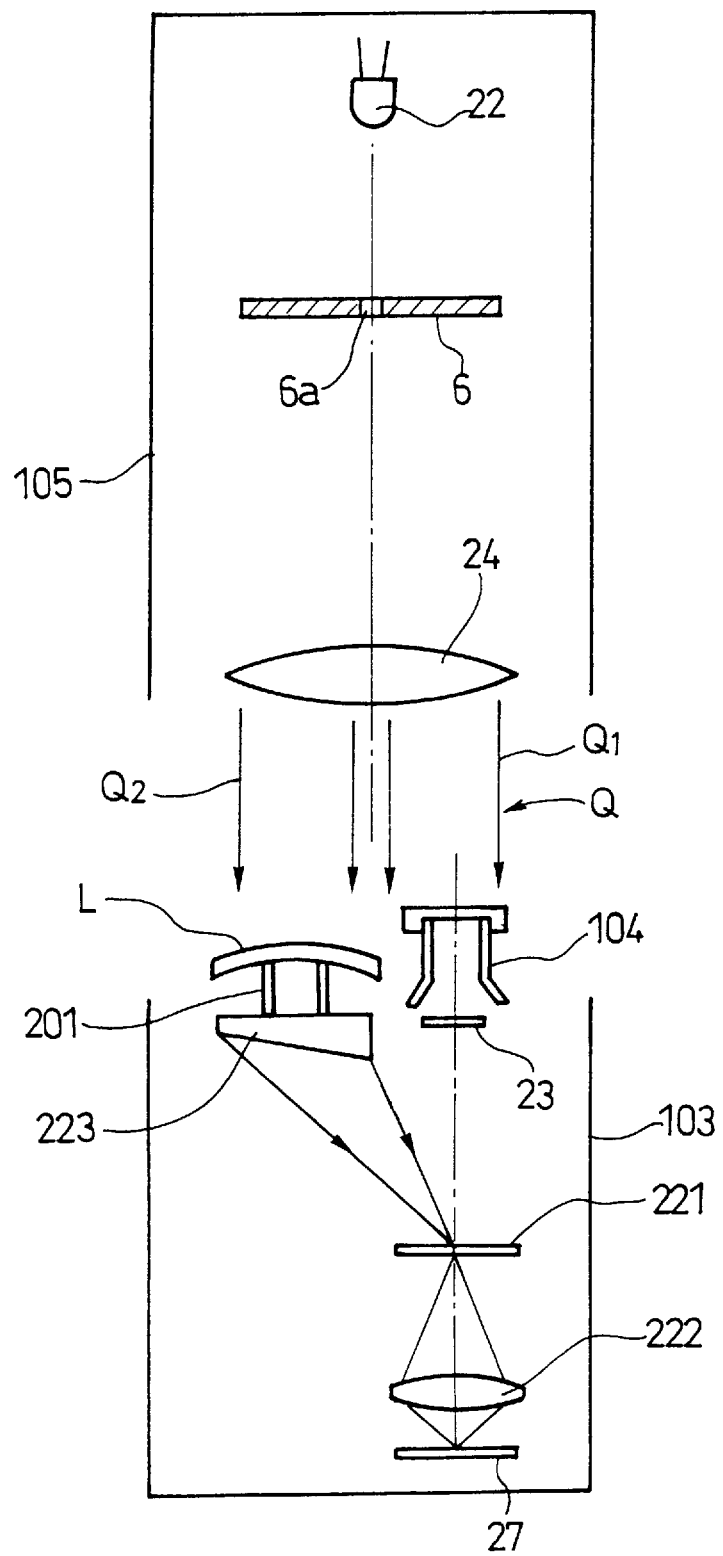
FIG. 29 is an optical layout diagram showing an optical system according to an eleventh embodiment of the present invention.

FIG. 29 shows an eleventh embodiment of the present invention. In the eleventh embodiment, a screen 221 and an image forming lens 222 are disposed in a first optical path Q1 so that the images of the patterns in a patterning plate 23, formed on the screen 221, are formed on an area sensor 27 by the image forming lens 222. Also, a prism 223 with positive power is disposed in a second optical path Q2. The image of the subject lens L is formed on the screen 221 by the prism 223, and the image formed on the screen 221 is formed on the area sensor 27 by the image forming lens 222. The prism 223 employs a portion of a convex lens.

Even in the aforementioned tenth embodiment and eleventh embodiment, as with the ninth embodiment, the measurement of the lens characteristics of the subject lens L and the observation of hidden marks can be performed without using the polarizing plate and the like and with a single light source 22 and yet without moving the patterning plate 23. Also, there is no possibility that the patterns in the patterning plate 23 will interfere in observing hidden marks.

(Twelfth Embodiment)

Figure 30:
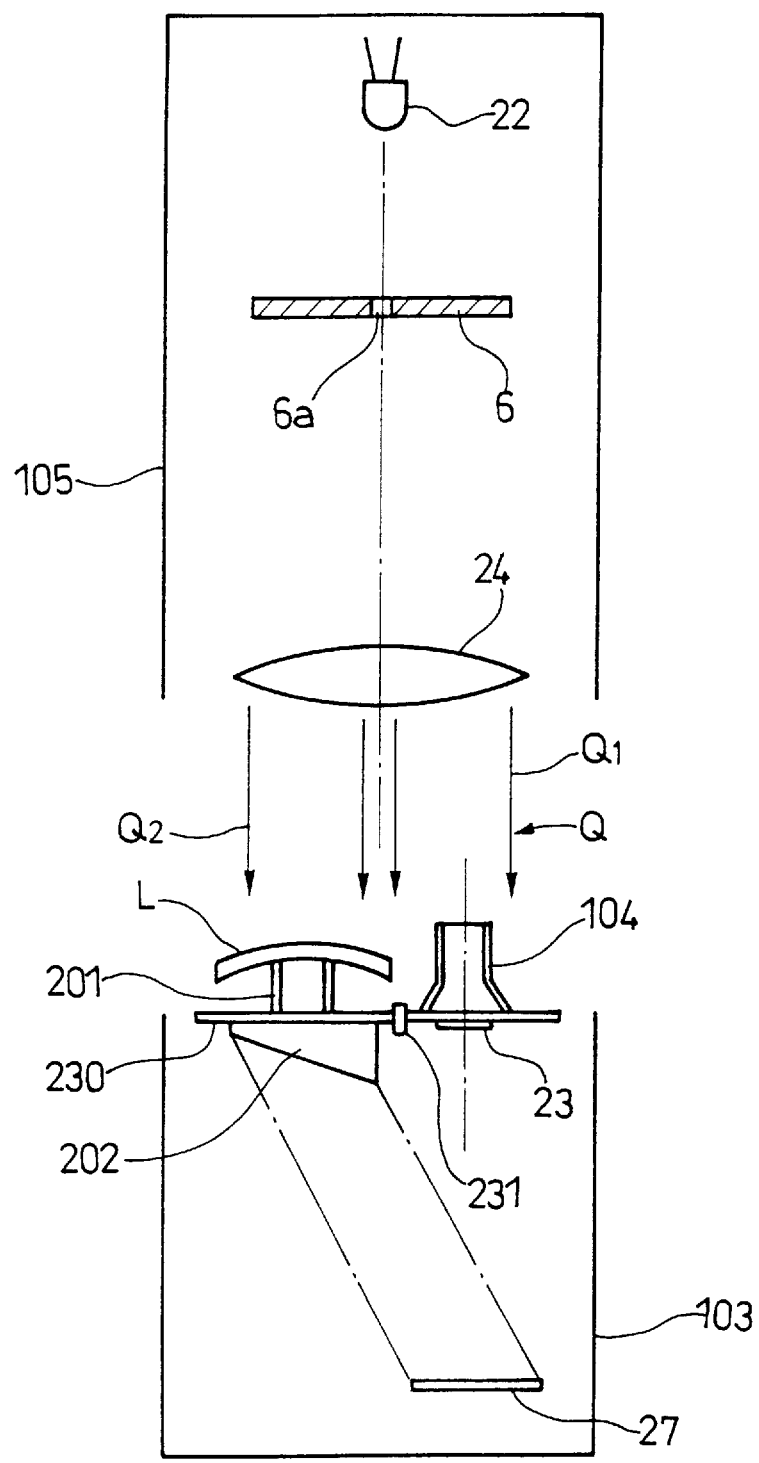
FIG. 30 is an optical layout diagram showing an optical system according to a twelfth embodiment of the present invention.
Figure 31:
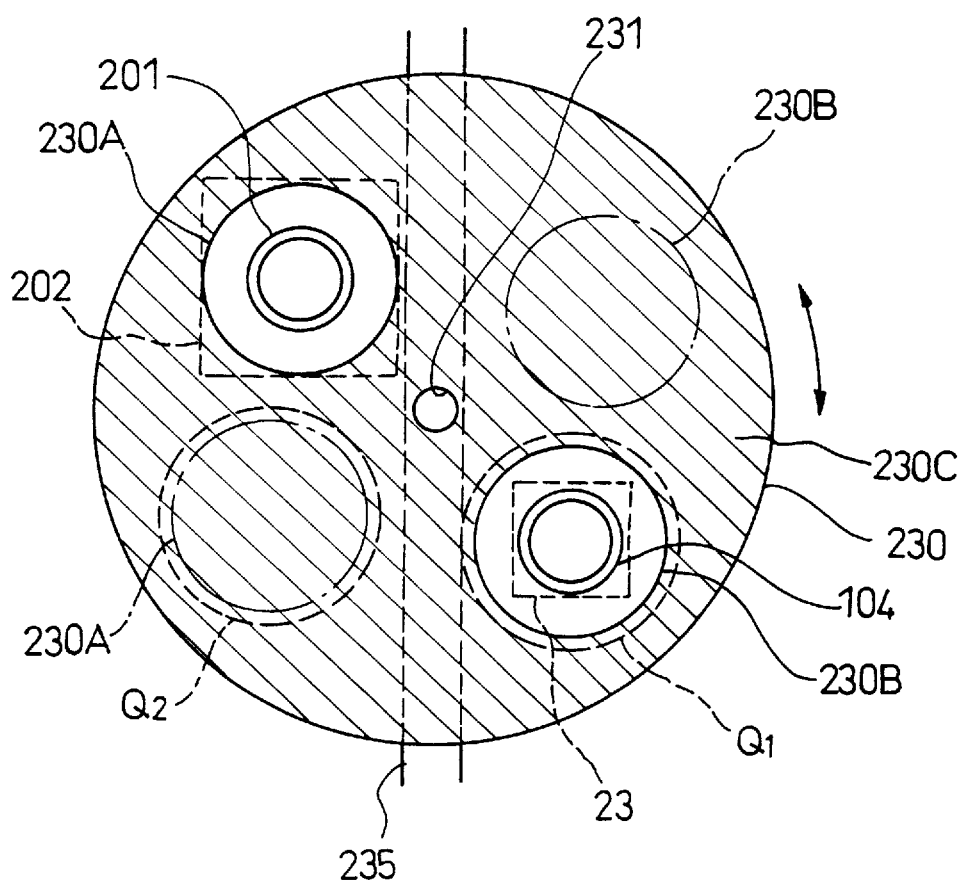
FIG. 31 is a plan view showing the rotary plate shown in FIG. 30.

FIG. 30 shows a twelfth embodiment of the present invention. In the twelfth embodiment, first and second lens receivers 104 and 201 and a patterning plate 23 are mounted on a rotary plate 230. The rotary plate 230, as shown in FIG. 31, is formed with first and second transmitting portions 230B and 230A at symmetrical positions relative to a rotational shaft 231. The portion other than the transmitting portions 230B and 230A is made into a light shielding portion 230C.

The second lens receiver 201 and a prism 202 are mounted on the second transmitting portion 230A, and the first lens receiver 104 and the patterning plate 23 are mounted on the first transmitting portion 230B. The rotational shaft 231 is held by a hold plate 235 provided in a cage-shaped body 103, and the rotary plate 230 is supported by the rotational shaft 231 so as to be free to rotate.

When the rotary plate 230 is positioned at a position shown in FIG. 31, the first transmitting portion 230A of the rotary plate 230 is removed from the second optical path Q2 and the first transmitting portion 230B is inserted into the first optical path 230B. If the rotary plate 230 is rotated 45° in a counterclockwise direction, then the second transmitting portion 230A will be inserted into the second optical path Q2 and the first transmitting portion 230B will be removed from the first optical path Q1.

In the twelfth embodiment, if only the rotary plate 230 is rotated, there will be no need to mount or demount the cap 203. Also, the measurement of the lens characteristics of the subject lens L and the observation of hidden marks can be performed without using the polarizing plate and the like and with a single light source 22. In addition, there is no possibility that the patterns in the patterning plate 23 will be hindrances in observing hidden marks.

What is claimed is:

1. A lens-meter for examining a lens having an optical characteristic, the lens-meter comprising:

means for illuminating the lens with a collimated light beam;

an area sensor for receiving said collimated light beam transmitted through the lens;

a patterning plate interposed between the lens and said area sensor, whereby an image is formed on said area sensor by said collimated light beam being transmitted through the lens and said patterning plate, thereby permitting the optical characteristic of the lens to be measured; and a hidden-mark observing system for observing a hidden-mark of the lens by observing a shadow of the lens formed by said collimated light beam projected onto the lens, wherein said patterning plate can be removed from and reinserted between the lens and said area sensor, and observation of the hidden-mark is performed when the shadow of the lens is projected onto said area sensor when said patterning plate is removed from between the lens and said area sensor.

2. A lens-meter for examining a lens having an optical characteristic, the lens-meter comprising:

means for illuminating the lens with a collimated light beam;

an area sensor for receiving said collimated light beam transmitted through the lens;

a patterning plate interposed between the lens and said area sensor, whereby an image is formed on said area sensor by said collimated light beam being transmitted through the lens and said patterning plate, thereby permitting the optical characteristic of the lens to be measured; and a hidden-mark observing system for observing a hidden-mark of the lens by observing a shadow of the lens formed by said collimated light beam projected onto the lens, wherein said patterning plate includes a liquid crystal shutter which is switched between a first state where a whole surface thereof is a transmitting surface and a second state where only a patterning portion for measuring the optical characteristic of the lens transmits light, and observation of the hidden-mark is performed when the shadow of the lens is projected onto said area sensor when said liquid crystal shutter is in said first state.

3. A lens-meter for examining a lens having an optical characteristic, the lens-meter comprising:

means for illuminating the lens with a collimated light beam;

an area sensor for receiving said collimated light beam transmitted through the lens;

a patterning plate interposed between the lens and said area sensor, whereby an image is formed on said area sensor by said collimated light beam being transmitted through the lens and said patterning plate, thereby permitting the optical characteristic of the lens to be measured; and a hidden-mark observing system for observing a hidden-mark of the lens by observing a shadow of the lens formed by said collimated light beam projected onto the lens, wherein said means for illuminating has a light source which emits at least both light of a first wavelength and light of a second wavelength different from said first wavelength, said patterning plate includes a dichroic mirror which reflects said light of the second wavelength and transmits said light of the first wavelength, and observation of the hidden-mark is performed when the shadow of the lens is projected onto said area sensor when said means for illuminating emits said light of the first wavelength.

4. A lens-meter for examining a lens having an optical characteristic, the lens-meter comprising:

means for illuminating the lens with a collimated light beam;

an area sensor for receiving said collimated light beam transmitted through the lens;

a patterning plate interposed between the lens and said area sensor, whereby an image is formed on said area sensor by said collimated light beam being transmitted through the lens and said patterning plate, thereby permitting the optical characteristic of the lens to be measured; and a hidden-mark observing system for observing a hidden-mark of the lens by observing a shadow of the lens formed by said collimated light beam projected onto the lens, wherein said patterning plate has a polarizing plate having a first polarization direction, said means for illuminating switches between and emits a first polarized light beam polarized in said first polarization direction and a second polarized light beam polarized in a second polarization direction different from said first polarization direction, and observation of the hidden-mark is performed when the shadow of the lens is projected onto said area sensor when said means for illuminating emits said first polarized light beam.

5. The lens-meter as set forth in any one of claims 1 through 4, wherein a type of the lens is automatically identified based on a hidden-mark image signal which is output by said area sensor.

6. A lens-meter comprising:

an optical measuring path provided with a patterning plate for measuring an optical characteristic of a lens to be examined; and an optical observing path for observing a hidden-mark of the lens, said optical observing path being provided separately from said optical measuring path, wherein an image of a pattern of said patterning plate and an image of said hidden-mark are projected onto a single area sensor so as to perform observation of the hidden-mark and measurement of the optical characteristic of the lens.

7. A lens-meter for examining a lens having an optical characteristic, the lens-meter comprising:

means for illuminating the lens with a collimated light beam;

an area sensor for receiving said collimated light beam transmitted through the lens; and a patterning plate interposed between the lens and said area sensor, whereby an image is formed on said area sensor by said collimated light beam being transmitted through the lens and said patterning plate, thereby permitting the optical characteristic of the lens to be measured, wherein an optical path for said collimated light beam is divided into a first optical path for measuring the optical characteristic and a second optical path for observing a hidden-mark of the lens, said patterning plate being provided in said first optical path, and a shadow of the lens, which is formed by the collimated light beam in said second optical path when the lens is placed within said second optical path, is projected onto said area sensor for receiving an image of a pattern, thereby permitting observation of said hidden-mark.

8. A lens-meter for examining a lens having an optical characteristic, the lens-meter comprising:

means for illuminating the lens with a collimated light beam;

an area sensor for receiving said collimated light beam transmitted through the lens; and a patterning plate interposed between the lens and said area sensor, whereby an image is formed on said area sensor by said collimated light beam being transmitted through the lens and said patterning plate, thereby permitting the optical characteristic of the lens to be measured, wherein an optical path for said collimated light beam is divided into a first optical path for measuring the optical characteristic and a second optical path for observing a hidden-mark of the lens, said patterning plate and said area sensor being provided in said first optical path, an optical element being provided for guiding a shadow of the lens to said area sensor, the shadow of the lens being formed by the collimated light beam in said second optical path when the lens is placed within said second optical path, and observation of the hidden-mark of the lens is performed when the shadow of the lens is formed on said area sensor.

9. The lens-meter as set forth in claim 7 or 8, wherein the light beam in said second optical path is shut off when measuring the optical characteristic of the lens and wherein the light beam in said first optical path is shut off when observing the hidden-mark of the lens.

10. The lens-meter as set forth in claim 8, wherein said optical member comprises a prism.

11. The lens-meter as set forth in claim 10, wherein said prism has negative power.

12. A lens-meter for examining a lens having an optical characteristic, the lens-meter comprising:

means for illuminating the lens with a collimated light beam;

an area sensor for receiving said collimated light beam transmitted through the lens; and a patterning plate interposed between the lens and said area sensor, whereby an image of a pattern is formed on said area sensor by said collimated light beam being transmitted through the lens and said patterning plate, thereby permitting the optical characteristic of the lens to be measured, wherein an optical path for said collimated light beam is divided into a first optical path for measuring the optical characteristic and a second optical path for observing a hidden-mark of the lens, said patterning plate and said area sensor are placed within said first optical path, a screen is interposed between said patterning plate and said area sensor, an image forming lens is provided for forming the image of a pattern that is formed on said screen or on said area sensor, an optical member is provided for guiding a shadow of the lens to said screen, the shadow of the lens being formed by the collimated light beam in said second optical path when the lens is placed within said second optical path, and observation of the hidden-mark of the lens is performed when the shadow of the lens is formed on said screen.

13. The lens-meter as set forth in claim 12, wherein said optical member comprises a prism.

14. The lens-meter as set forth in claim 13, wherein said prism has positive power.

* * * * *